US008711415B2

(12) United States Patent
Nagata

(10) Patent No.: US 8,711,415 B2
(45) Date of Patent: Apr. 29, 2014

(54) ACCOUNT MANAGING DEVICE, IMAGE PROCESSING SYSTEM, AND STORAGE MEDIUM

(75) Inventor: Yoshinori Nagata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 61 days.

(21) Appl. No.: 13/451,069

(22) Filed: Apr. 19, 2012

(65) Prior Publication Data
US 2012/0300252 A1 Nov. 29, 2012

(30) Foreign Application Priority Data

May 24, 2011 (JP) ................................ 2011-116207

(51) Int. Cl.
G06K 15/02 (2006.01)
(52) U.S. Cl.
USPC ....... 358/1.15; 358/1.14; 358/1.13; 358/1.12; 358/1.16; 705/52; 709/220; 709/204; 726/3; 726/10
(58) Field of Classification Search
None
See application file for complete search history.

(56) References Cited

U.S. PATENT DOCUMENTS

| 5,802,260 | A  | * | 9/1998  | Shimakawa et al. | ......... 358/1.15 |
| 6,307,640 | B1 | * | 10/2001 | Motegi | ......... 358/1.14 |
| 8,218,165 | B2 | * | 7/2012  | Matsushima | ......... 358/1.14 |
| 2009/0199280 | A1 | | 8/2009 | Muto | |
| 2010/0235904 | A1 | | 9/2010 | Ikeda | |

FOREIGN PATENT DOCUMENTS

| JP | 2009-187309 A | 8/2009 |
| JP | 2010-044519 A | 2/2010 |
| JP | 2010-218144 A | 9/2010 |

* cited by examiner

Primary Examiner — Ashish K Thomas
(74) Attorney, Agent, or Firm — Edwards Wildman Palmer LLP; David G. Conlin; David A. Tucker

(57) ABSTRACT

A control device of an account managing server carries out (i) a first process in which the control device (a) obtains client identification information from a client PC via a network and (b) controls a storage device to store, as provisional login information, first login information contained in the client identification information, (ii) a second process in the control device (c) obtains second login information inputted into a multifunction peripheral and (iii) a third process in which the control device (d) permits usage of the multifunction peripheral in a case where the second login information is identical to the provisional login information stored in the storage device. This makes it unnecessary for a user to register login information of a client device newly connected to the network.

6 Claims, 25 Drawing Sheets

F I G. 7
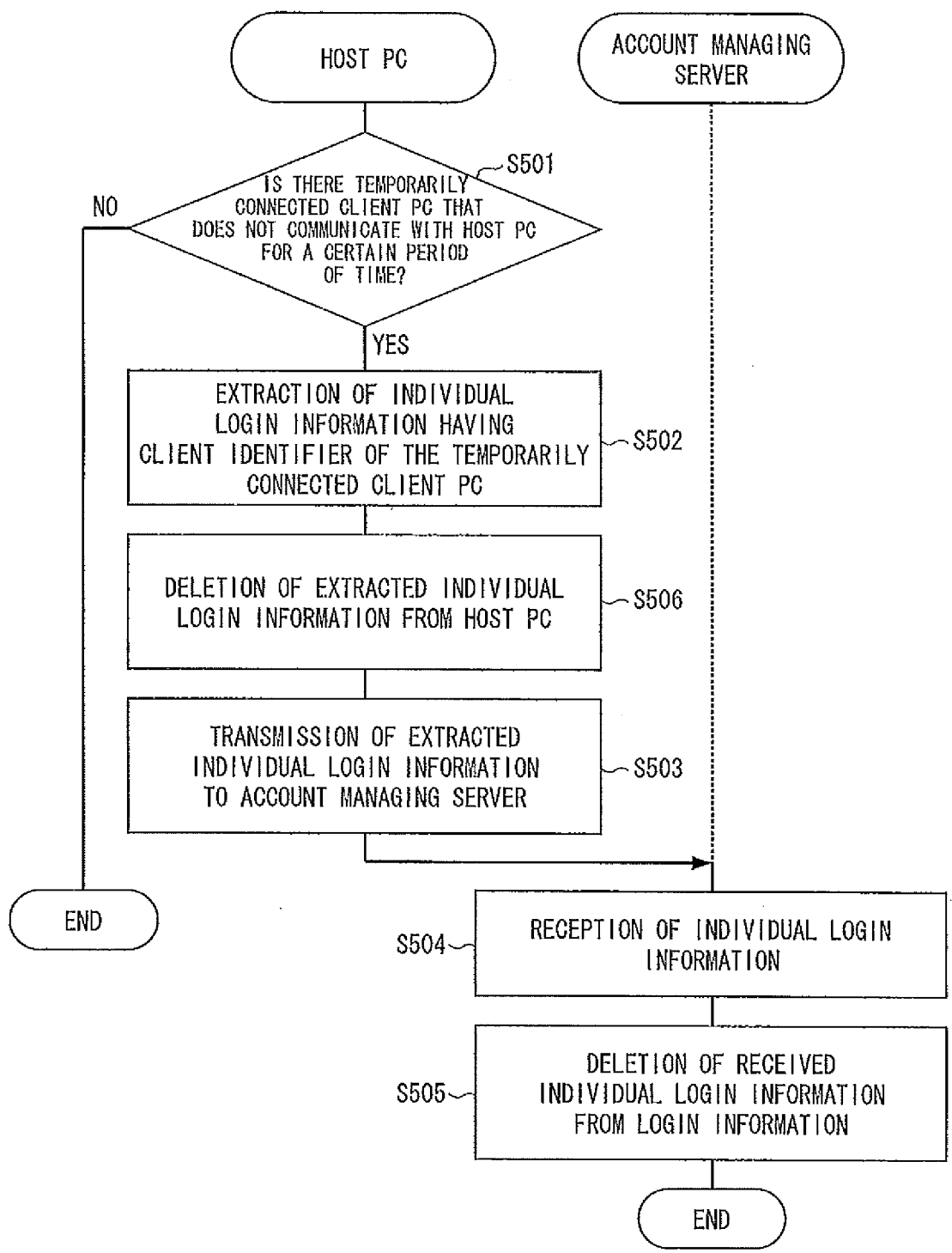

FIG. 18

```
PLEASE SELECT SCANNING CONDITION

| TARGET TO BE | SCANNING  | PC PROCESS |
|   SCANNED    | CONDITION |            |

COLOR MODE          [ FULL COLOR ]
PAPER SIZE          [     A4     ]         ↑
RESOLUTION          [   300DPI   ]              — 204
DOUBLE-SIDE         [    YES     ]         ↓
SCANNING
CONCENTRATION       [   NORMAL   ]

(EXECUTION) — 209
```

FIG. 19

```
PLEASE SELECT SCANNING CONDITION
┌─────────────────────────────────────────┐
│   DETAILS OF PROFILE HAS BEEN CHANGED   │
│                                         │
│                                         │
│          SAVE CHANGED PROFILE?          │
│                                         │
│        210        211         212       │
│      ┌─────┐ ┌──────────┐ ┌──────────┐  │
│      │ NO  │ │OVERWRITING│ │NEWLY SAVING│
│      └─────┘ │  SAVE    │ └──────────┘  │
│              └──────────┘               │
└─────────────────────────────────────────┘
                                  (EXECUTION) — 209
```

F I G. 2 4

(PC PROCESSING CONDITION)

| SKEW CORRECTION ON/OFF |
| --- |
| SKEW CORRECTION PARAMETER |
| CHARACTER RECOGNITION ON/OFF |
| CHARACTER RECOGNITION PARAMETER |
| IMAGE HIGH COMPRESSION ON/OFF |
| IMAGE HIGH COMPRESSION PARAMETER |
| . . . |
| APPLICATION STARTUP ON/OFF |
| APPLICATION STARTUP PARAMETER |

F I G. 2 5
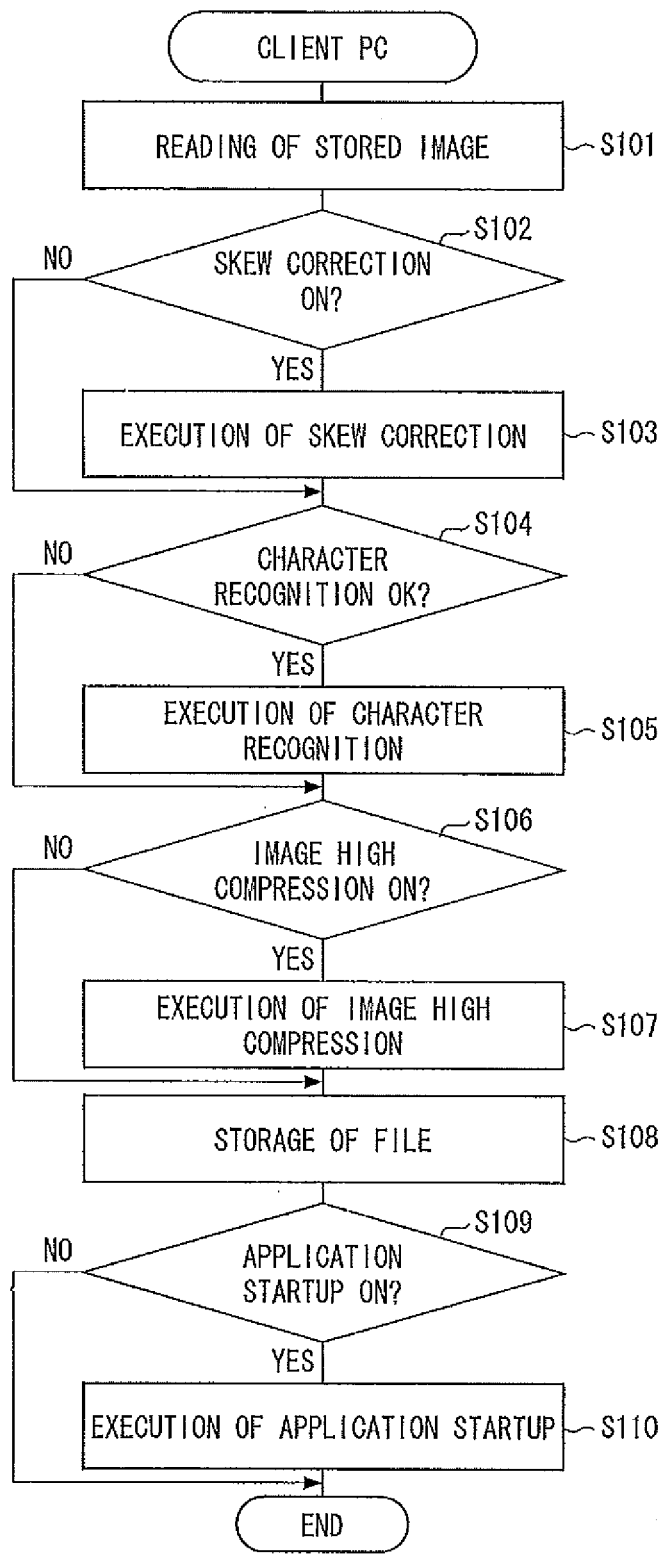

ACCOUNT MANAGING DEVICE, IMAGE PROCESSING SYSTEM, AND STORAGE MEDIUM

This Nonprovisional application claims priority under 35 U.S.C. §119 on Patent Application No. 2011-116207 filed in Japan on May 24, 2011, the entire contents of which are hereby incorporated by reference.

TECHNICAL FIELD

The present invention relates to (i) an account managing device for managing user's usage of an image processing device, (ii) an image processing system and (iii) a storage medium.

BACKGROUND ART

A multifunction peripheral having, in addition to a function of a copying machine, a function of a facsimile, a function of a scanner, a document filing function or like function, has been conventionally in widespread use as a multifunctional image forming apparatus. A system having a network to which such a multifunction peripheral is connected includes an image processing system for (i) receiving login information entered by a user so that the user can use the multifunction peripheral, (ii) permitting a usage of the multifunction peripheral in response to the entering of the login information and (iii) limiting a function to be used in accordance with the login information.

The image processing system conducts an authentication process with respect to the login information entered by the user so as to permit or refuse the usage of the multifunction peripheral according to the login information. The image processing system pre-registers therein a user account so as to conduct the authentication process.

According to, for example, Patent Literature 1, a plurality of information processing devices having respective authentication functions conduct the following processes so as to conduct a job in cooperation with each other, so that the plurality of information processing devices conduct a process for registering a user account therein. That is, a first information processing device that cooperates with a second information processing device supplies, to the second information processing device to be cooperated, authentication information authenticated by the first information processing device. The second information processing device creates a user account on the basis of the authentication information, and conducts a job according to the user account.

CITATION LIST

Patent Literatures

Patent Literature 1
Japanese Patent Application Publication, Tokukai No. 2010-218144 A (Publication Date: Sep. 30, 2010)
Patent Literature 2
Japanese Patent Application Publication, Tokukai No. 2009-187309 A (Publication Date: Aug. 20, 2009)

SUMMARY OF INVENTION

Technical Problem

However, for example, a technique of Patent Literature 1 does not consider a process for creating a user account of an information processing device introduced into a predetermined image processing system from an outside. Therefore, in this case, a user has to register a user account of the information processing device introduced into the predetermined image processing system.

Specifically, a business traveler (user) has to register a provisional account of an information processing device brought in an account managing device of an image processing system in a case where the business traveler (i) brings the information processing device into an office where the business traveler makes a business trip and (ii) connects the information processing device to the image processing system. That is, the user has to register his user account.

An object of the present invention is to provide (i) an account managing device that does not require a user to register a user account of an information processing device, (ii) an image processing system and (iii) a storage medium.

Solution to Problem

In order to attain the object, an account managing device of the present invention is an account managing device, to be connected to an image processing device and a client device via a network, the account managing device, including: a storage device; and a control section, the control section carrying out: (i) a first process in which the control section (a) obtains client identification information from the client device via the network and (b) controls the storage device to store, as provisional login information, first login information contained in the client identification information; (ii) a second process in which the control section (c) obtains second login information, which is inputted into the image processing device and is necessary for a usage of the image processing device; and (iii) a third process in which the control section (d) permits the usage of the image processing device in a case where the second login information is identical to the provisional login information stored in the storage device.

According to the configuration, the control section obtains the client identification information from the client device via the network, and controls the storage device to store, as the provisional login information, the first login information contained in the client identification information. The control section also obtains the second login information, which is inputted into the image processing device and necessary for a usage of the image processing device. Further, the control section permits the usage of the image processing device in a case where the second login information is identical to the provisional login information stored in the storage device.

This configuration makes it unnecessary for a user to, register login information of a client device newly connected to the network. Therefore, for example, a business traveler with a laptop that serves as a client device can be automatically permitted to use an image processing device.

Advantageous Effects of invention

According to the configuration of the present invention, it is unnecessary for a user to register login information of a client device newly connected to the network. Therefore, for example, a business traveler with a laptop that serves as a client device can be automatically permitted to use an image processing device.

BRIEF DESCRIPTION OF DRAWINGS

FIG. 7 is a flowchart showing how the host PC and the account managing server operate in a case where login information is deleted in the account managing server of FIG. 1.

FIG. 9 is a flowchart showing how the account managing server and a multifunction peripheral of the image processing system of FIG. 1 operate when and after a user logs into the multifunction peripheral that is standing by.

FIG. 18 is an explanatory view showing a detail displaying screen, of a profile, displayed on the display device of the multifunction peripheral of FIG. 1 in S31 of FIG. 13.

FIG. 19 is an explanatory view showing a saving confirmation screen, of a profile, displayed on the display device of the multifunction peripheral of FIG. 1 in S43 of FIG. 14.

FIG. 24 is an explanatory view schematically showing a data structure of a PC processing condition contained in the profile information of FIG. 4.

FIG. 25 is a flowchart showing a PC process conducted by the client PC in a case where a profile selected from the profile list screen of FIG. 17 by a user contains a PC processing condition.

DESCRIPTION OF EMBODIMENTS

The following description will discuss an embodiment of the present invention with reference to drawings.

Figure 1:
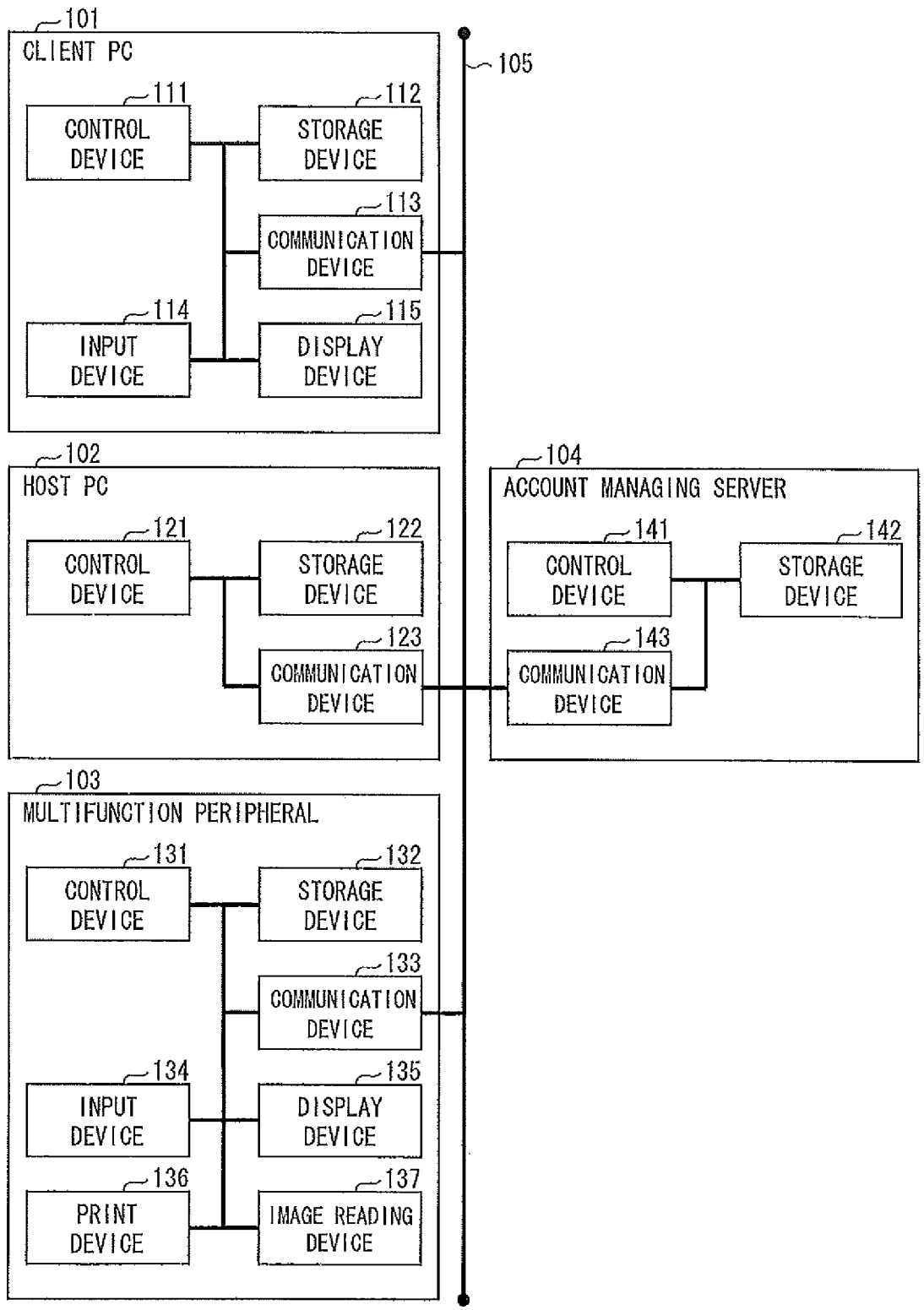
FIG. 1 is a block diagram showing a configuration of an image processing system of an embodiment of the present invention.

FIG. 1 is a block diagram showing an image processing system of the embodiment of the present invention. The information processing system functions also as an account managing system. Note that a personal computer is hereinafter referred to merely as a PC.

As shown in FIG. 1, the information processing system includes a client PC (a client device) 101, a host PC (a host device, an account managing device) 102, a multifunction peripheral (an image processing device) 103, and an account managing server (a managing device, an account managing device) 104. The client PC 101, the host PC 102, the multifunction peripheral 103, and the account managing server 104 are connected to one another via a network 105.

The client PC 101 includes a control device 111, a storage device 112, a communication device 113, an input device 114, and a display device 115. The communication device 113 is connected to the network 105. The control device 111 includes a CPU. The storage device 112 includes a hard disc drive and a RAM. The communication device 113 includes a LAN card, The input device 114 includes a keyboard and a mouse. The display device 115 includes a liquid crystal display. The host PC 102 includes a control device (a control section, a control section of the host PC 102) 121, a storage device 122, and a communication device 123. The communication device 123 is connected to the network 105. The control device 121 includes a CPU. The storage device 122 includes a hard disc drive and a RAM. The communication device 123 includes a LAN card.

The host PC 102 provides various user interfaces, via which pieces of data are displayed on the display devices 115 and 135 in response to requests from respective of the client PC 101 and the multifunction peripheral 103. The host PC 102 holds or creates pieces of display data for the respective various user interfaces.

The multifunction peripheral 103 includes a control device (a control section of an image forming apparatus) 131, a storage device 132, a communication device 133, an input device 134, a display device 135, a print device 136, and an image reading device 137. The communication device 133 is connected to the network 105. The control device 131 includes a CPU. The storage device 132 includes a hard disc drive and a RAM. The communication device 133 includes a LAN card. The input device 134 includes a numeric keypad and a touch panel. The display device 135 includes a liquid crystal display. The display device 135 is provided in, for example, an operation panel of the multifunction peripheral 103. The print device 136 prints image data onto paper. The image reading device 137 reads information written on paper, and creates image data of the information.

The account managing server 104 includes a control device (a control section, a control section of an managing device) 141, a storage device 142, and a communication 143. The communication device 143 is connected to the network 105. The control device 141 includes a CPU. The storage device 142 includes a hard disc drive and a RAM. The communication device 143 includes a LAN card.

Figure 2:
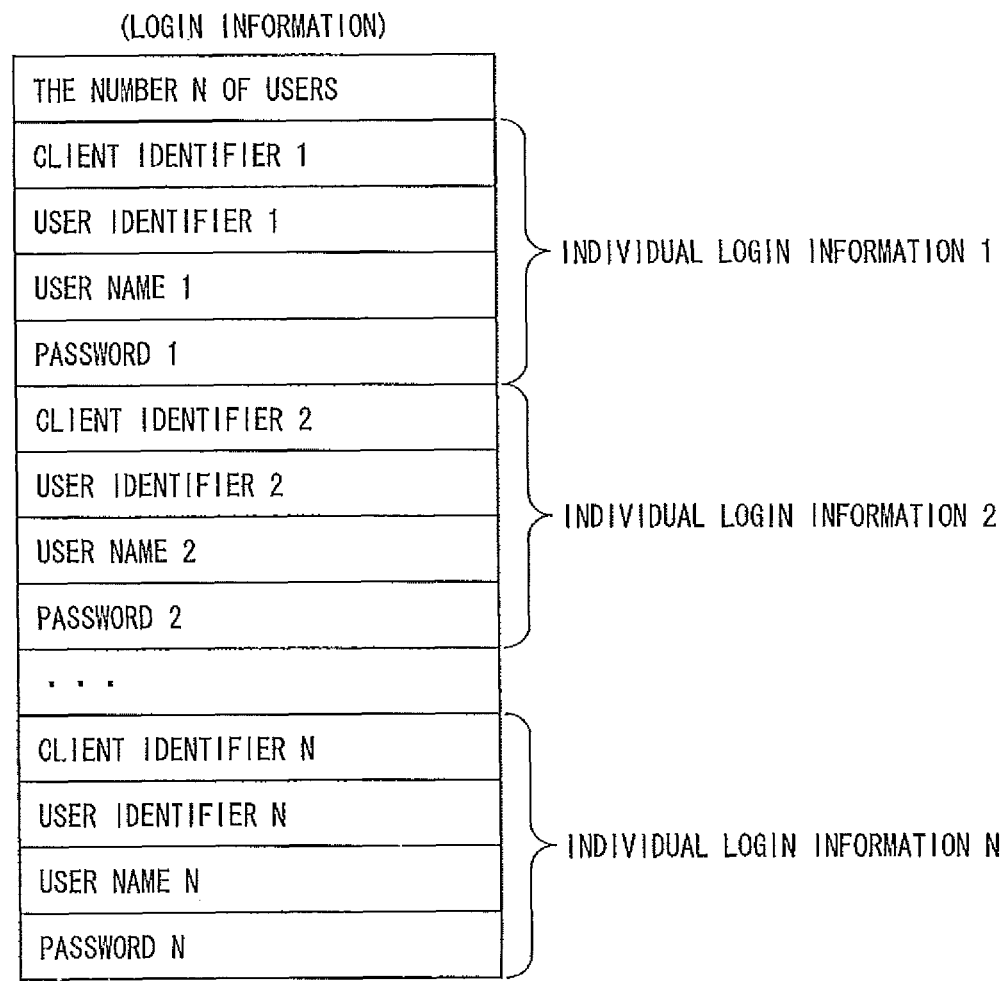
FIG. 2 is an explanatory view schematically showing a data structure of login information stored in a storage device of a client PC, a storage device of a host PC, and a storage device of an account managing server.
Figure 3:
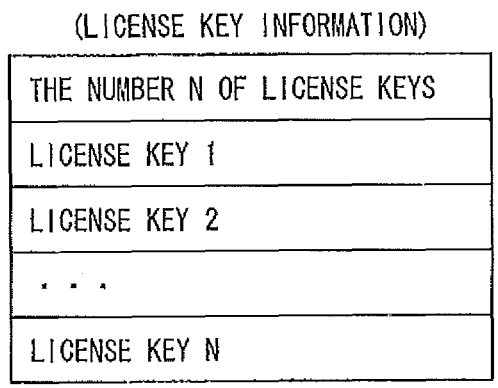
FIG. 3 is an explanatory view schematically showing a data structure of license key information stored in the storage device of the host PC of FIG. 1.

FIG. 2 is an explanatory view schematically showing a data structure of login information stored in each of (i) the storage device 112 of the client PC 101, (ii) the storage device 122 of the host PC 102, and (iii) the storage device 142 of the account managing server 104 (see FIG. 1). FIG. 3 is an explanatory view schematically showing a data structure of license key information stored in the storage device 122 of the host PC 102 illustrated in FIG. 1.

As shown in FIG. 2, the login information includes the number N of users, and as many pieces of individual login information (pieces of individual login information 1 through N). Each of the pieces of individual login information includes a client identifier for identifying a client PC 101 corresponding to a piece of individual login information, a user identifier for identifying a user, a user name, and a password.

As shown in FIG. 3, the license key information includes the number N of license keys and as many license keys. Each license key is a character string for identifying a license given to a corresponding client PC 101.

The pieces of individual login information of the login information of FIG. 2 are related to the respective license keys of the license key information of FIG. 3. Specifically, individual login information 1 corresponds to a license key 1, individual login information 2 corresponds to a license key 2, and individual login information N corresponds to a license key N.

Figure 4:
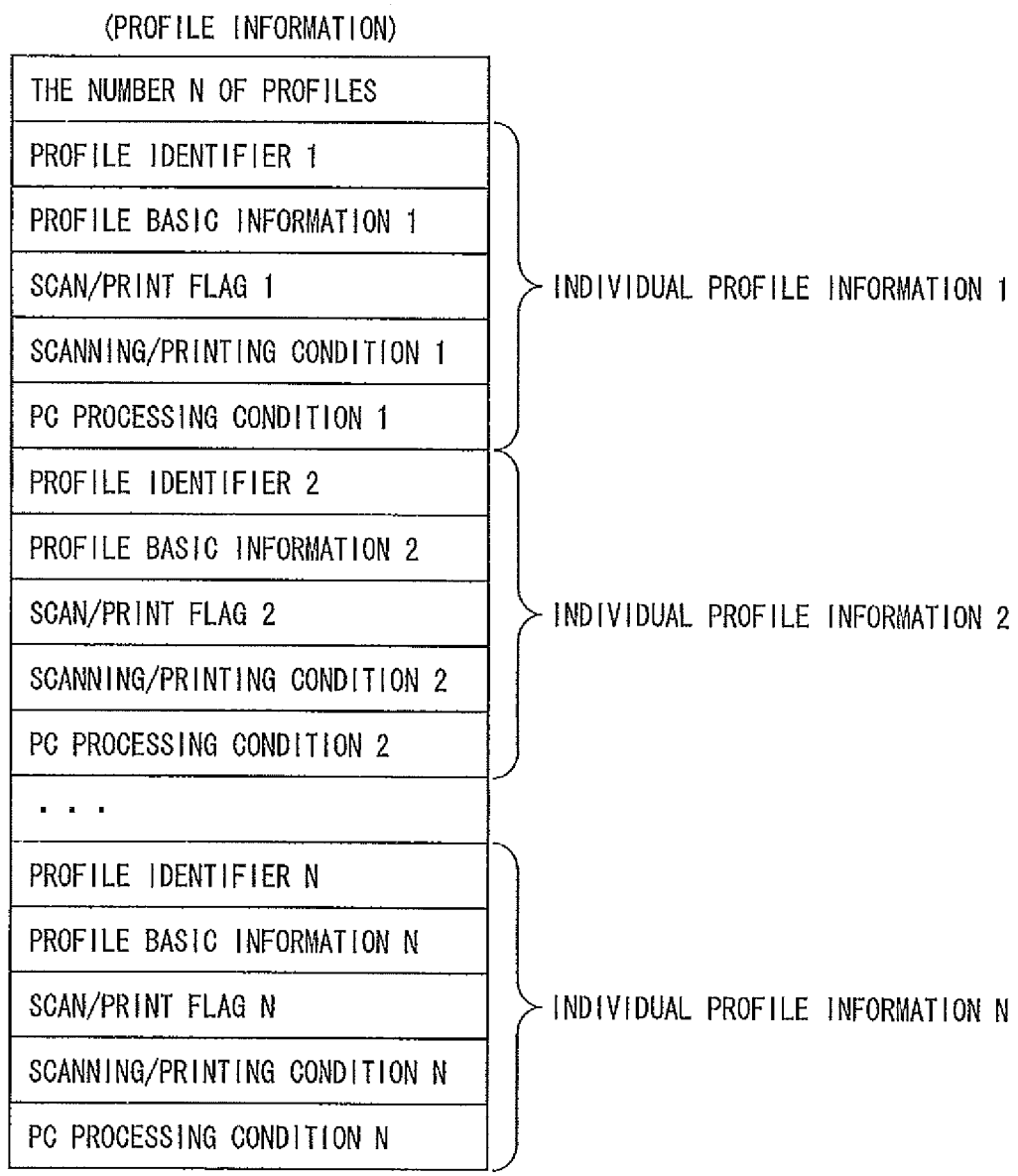
FIG. 4 is an explanatory view schematically showing a data structure of profile information stored in the storage device of the client PC and the storage device of the host PC of FIG. 1.
Figure 5:
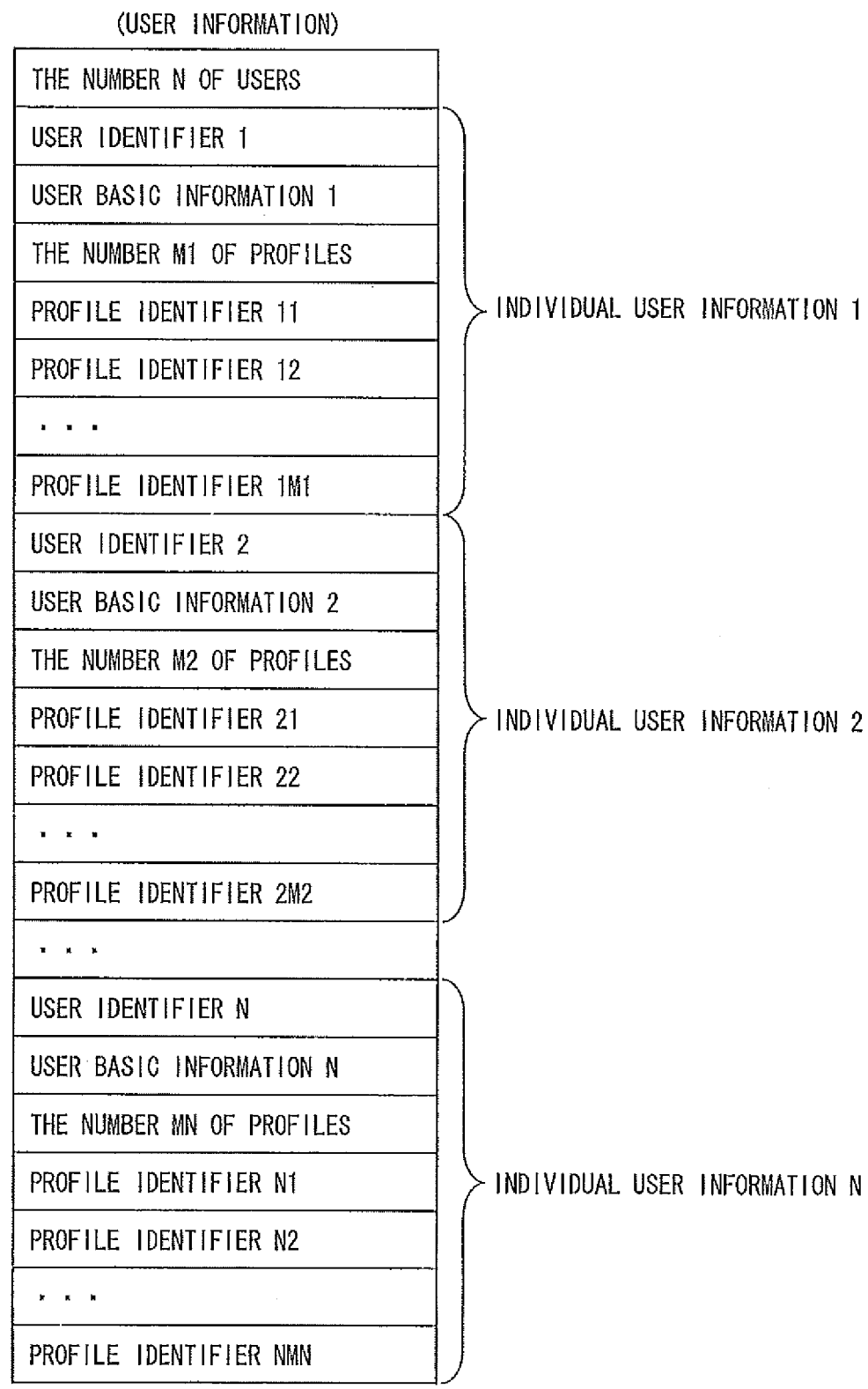
FIG. 5 is an explanatory view schematically showing a data structure of user information stored in the storage device of the client PC and the storage device of the host PC of FIG. 1.

FIG. 4 is an explanatory view schematically showing a data structure of a piece of profile information stored in each of (i) the storage device 112 of the client PC 101 and (ii) the storage device 122 of the host PC 102 (see FIG. 1). FIG. 5 is an explanatory view schematically showing a data structure of a piece of user information stored in each of (a) the storage device 112 of the client PC 101 and (b) the storage device 122 of the host PC 102 (see FIG. 1). The profile information and the user information are created by the client PC 101 or the host PC 102.

Note that a profile created for each of users in the image processing system of the present embodiment includes (i) a scan profile to be used when the image reading device 137 of the multifunction peripheral 103 scans and (ii) a print profile used when the print device 136 prints, The scan profile and the print profile are stored in each of (i) the storage device 112 of the client PC 101 and (ii) the storage device 122 of the host PC 102.

The profile information of FIG. 4 is related to the user information of FIG. 5. Specifically, the pieces of profile information are provided for respective pieces of individual user information 1 through N of the user information of FIG. 5. Each of the pieces of individual user information is provided for a corresponding one of the users. A profile identifier 11 of the individual user information 1 of FIG. 5 corresponds to a profile identifier 1 of individual profile information 1 of FIG. 4, a profile identifier 12 of the individual user information 1 of FIG. 5 corresponds to a profile identifier 2 of individual profile information 2 of FIG. 4, . . . , and a profile identifier 1M1 of the individual user information 1 of FIG. 5 corresponds to a profile identifier N of individual profile information N of FIG. 4.

As shown in FIG. 4, the profile information includes (i) information on the number N of profiles (the number of pieces of individual profile information) included in the profile information and (ii) as many pieces of individual profile information 1 through N.

Each of the pieces of individual profile information 1 through N includes a profile identifier, a profile name, a piece of profile basic information, a scan/print flag, a scanning/printing condition, and a PC process condition, Each profile identifier distinguishes a corresponding one of pieces of individual profile information including the each profile identifier from the others of the pieces of individual profile information so as to identify the corresponding one of the pieces of individual profile information. Each profile basic information is information such as profile icon information determined for a corresponding profile (a corresponding one of the pieces of individual profile information). Each scan/print flag is a flag for determining that a profile indicated by a corresponding one of the pieces of individual profile information is either a scan profile or a print profile. Each scanning/printing condition is indicative of (i) a condition (scanning condition) used in a case where the image reading device 137 of the multifunction peripheral 103 scans or (ii) a condition (printing condition) used in a case where the print device 136 prints, depending on whether a profile indicated by a corresponding one of the pieces of individual profile information is a scan profile or a print profile, respectively. The PC process condition is indicative of a condition under which the client PC 101 or the host PC 102 conducts a PC process.

As shown in FIG. 5, the user information includes (i) information on the number N of users (the number of pieces of individual user information) contained in the user information and (ii) as many pieces of individual user information 1 through N. Each of the pieces of individual user information 1 through N includes (a) a user identifier, (b) a user name, (c) a piece of user basic information, (d) information on the number of profiles M1 through MN (the number of profiles which a corresponding user has) contained in a corresponding one of the pieces of individual user information 1 through N, and (e) profile identifiers.

Each user identifier distinguishes a corresponding one of pieces of individual user information including the each user identifier from the others of the pieces of individual user information so as to identify the corresponding one of the pieces of individual user information. Each user basic information is information such as user icon information determined for a corresponding user (a corresponding one of the pieces of individual user information). Each of the pieces of individual user information 1 through N includes the profile identifiers whose number is equal to the number of profiles M1 through MN.

Figure 6:
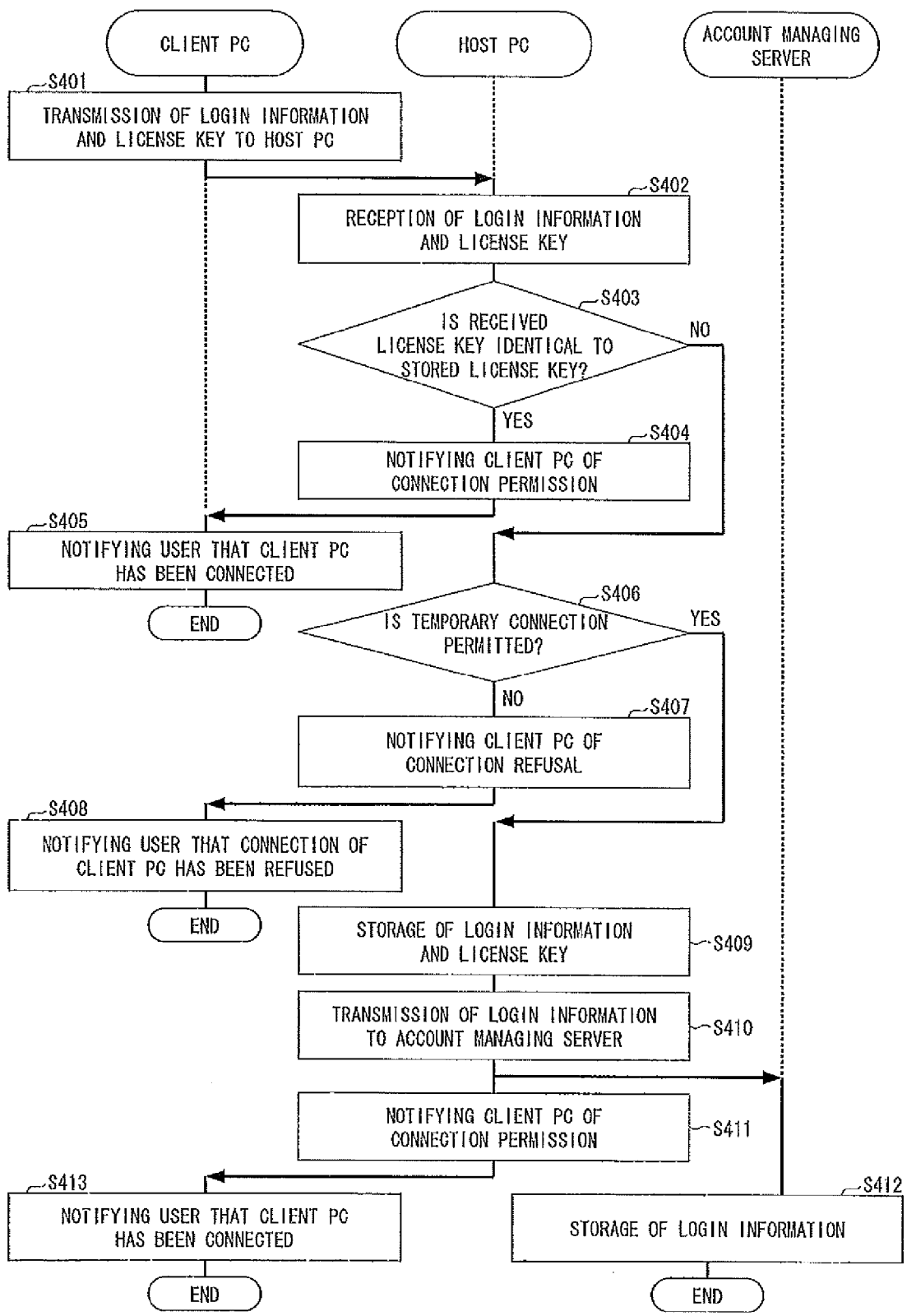
FIG. 6 is a flowchart showing how the client PC, the host PC, and the account managing server operate in a case where login information is registered in the image processing system of FIG. 1.

The following description will discuss an operation of the above-configured image processing system of the present embodiment. FIG. 6 is a flowchart showing an operation conducted in a case where login information is registered in the image processing system of FIG. 1. The operation includes a process conducted in a case where a client PC 101, that has not been registered with respect to the host PC 102, is connected to the host PC 102.

As shown in FIG. 6, when the client PC 101 is connected to the host PC 102 via the network 105, the control device 111 of the client PC 101 transmits, to the host PC 102 via the communication device 113 and the network 105, (i) login information stored in the storage device 112 and (ii) a license key, stored in the storage device 112, which has been assigned to the client PC 101 (S401).

The control device 121 of the host PC 102 receives the login information (client identification information) and the license key (client identification information) from the client PC 101 via the network 105 and the communication device 123 (S402).

The control device 121 of the host PC 102 determines whether or not a received license key matches any one of license keys of license key information stored in the storage device 122 (S403). In a case where the control device 121 of the host PC 102 determines that the received license key matches any one of the license keys, the control device 121 of the host PC 102 determines that a connection request from the client PC 101 is not a temporary connection request, and notifies the client PC 101 of connection permission via the communication device 123 and the network 105 (S404).

The control device 111 of the client PC 101 receives the connection permission from the host PC 102 via the network 105 and the communication device 113. In response to the connection permission, the control device 111 of the client PC 101 notifies a user of information on the connection permission (S405). Thus, the control device 111 of the client PC 101 ends a process.

In contrast, in a case where the control device 121 of the host PC 102 determines in 5403 that the received license key does not match any one of the license keys, the control device 121 of the host PC 102 determines that the connection request from the client PC 101 is the temporary connection request, and further determines whether or not a temporary connection is set to be permitted (S406). In a case where the control device 121 of the host PC 102 determines in S406 that the temporary connection is not set to be permitted, the control device 121 of the host PC 102 notifies the client PC 101 of a connection refusal via the communication device 123 and the network 105 (S407). Note that whether to permit a temporary connection is set in advance with respect to the host PC 102 by a user.

The control device 111 of the client PC 101 receives the connection refusal from the host PC 102 via the network 105 and the communication device 113. In response to the connection refusal, the control device 111 of the client PC 101 notifies a user of information on the connection refusal (S408). Thus, the control device 111 of the client PC 101 ends a process.

In contrast, in a case where the control device 121 of the host PC 102 determines in 5406 that the temporary connection is set to be permitted, the control device 121 of the host PC 102 controls the storage device 122 to store the login information and the license key transmitted from the client PC 101 (S409). Then, the control device 121 of the host PC 102 transmits the login information as provisional login information to the account managing server 104, via the communication device 123 and the network 105 (S410). Subsequently, the control device 121 of the host PC 102 notifies the client PC 101 of connection permission, via the communication device 123 and the network 105 (S411).

The control device 131 of the account managing server 104 receives the login information (the provisional login information) from the host PC 102, via the network 105 and the communication device 143. In response to the login information, the control device 131 of the account managing server 104 controls the storage device 142 to store the login information (S412).

The storage device 142 is controlled to separately store (i) login information (provisional login information) of a temporarily connected client PC 101 and (ii) normal login information of a normal client device 101. Note that the normal login information is set by a procedure different from a procedure by which the provisional login information is set.

The provisional login information is registered, in the host PC 102 and in the account managing server 104, as an account of a user name, defined in advance by the host PC 102, such as a "guest" plus serial number (see S409 and S412 of FIG. 6). The provisional login information is provisional login information, such as information defined by a "guest" account, which is defined in accordance with a predetermined rule (see FIGS. 10 and 17).

The control device 111 of the client PC 101 receives the connection permission from the host PC 102 via the network 105 and the communication device 113. In response to the connection permission, the control device 111 of the client PC 101 notifies a user of information on the connection permission (S413). Thus, the control device 111 of the client PC 101 ends a process.

Note that in S413, the host PC 102 can notify the client PC 101 of the provisional login information such as the "guest" plus serial number, and a login password.

FIG. 7 is a flowchart showing how the host PC 102 and where individual login information is deleted.

The control device 121 of the host PC 102 monitors whether or not a client PC 101 is connected to the host PC 102. As shown in FIG. 7, in a case where the control device 121 of the host PC 102 detects the presence(s) of at least one client PC 101 which has not connected to the host PC 102 for a certain period of time (S501), the control device 121 of the host PC 102 extracts, as a piece(s) of candidate individual login information to be deleted, a piece(s) of individual login information having a client identifier(s) of such at least one client PC 101 from the pieces of login information stored in the storage device 122 (S502). The control device 121 of the host PC 102 deletes, from the storage device 122, the piece(s) of candidate individual login information to be deleted (S506).

The control device 121 of the host PC 102 transmits, to the account managing server 104 via the communication device 123 and the network 105, the piece(s) of candidate individual login information to be deleted (S503).

The control device 141 of the account managing server 104 receives, from the host PC 102 via the network 105 and the communication device 143, the piece(s) of candidate individual login information to be deleted (S504). In response to the piece(s) of candidate individual login information to be deleted, the control device 141 of the account managing server 104 deletes, from the pieces of login information stored in the storage device 142, all of a piece(s) of individual login information (provisional login information) matching the piece(s) of candidate individual login information to be deleted (S505). Thus, the control device 141 of the account managing server 104 ends a process.

The steps S506 and S505 make it possible to prevent unnecessary login information from being accumulated in the storage device 122 and in the storage device 142, respectively. Examples of the unnecessary login information include login information of a laptop brought back by a person who made a business trip. This allows (i) a free area to be secured in each of the storage devices 122 and 142 and (ii) an improvement in processing efficiency of each of the host PC 102 and the account managing server 104.

Figure 8:
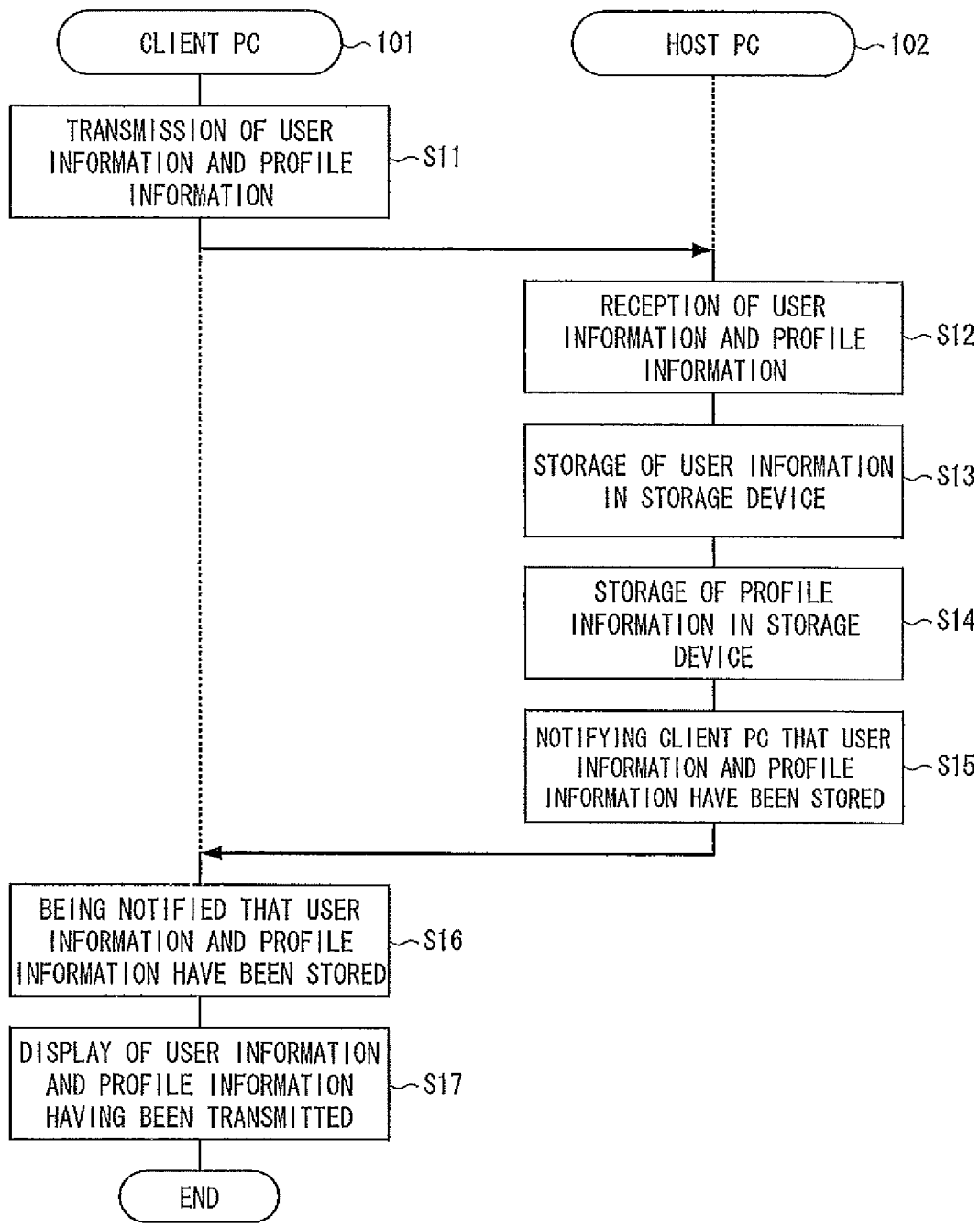
FIG. 8 is a flowchart showing (i) an operation of the image processing system, which operation is conducted after the client PC of FIG. 1 is connected to the host PC and (ii) how a host PC stores user information and profile information that are stored in a client PC.

The following description will discuss how the client PC 101 and the host PC 102 operate after the client PC 101 is connected to the host PC 102. FIG. 8 is a flowchart showing (i) an operation of the image processing system, which operation is conducted after the client PC 101 is connected to the host PC 102 and (ii) how the host PC 102 stores user information and profile information stored in the client PC 101. That is, the operation includes a process conducted in a case where login information (user identifier) of the client PC 101 has already been registered in the host PC 102 (such a case including a case where the client PC 101 has already been registered in the process of FIG. 6).

According to FIG. 8, when the client PC 101 is connected to the host PC 102 via the network 105, the control device 111 of the client PC 101 transmits the user information and the profile information, which are stored in the storage device 112, to the host PC 102 via the communication device 113 and the network 105 (S11).

The control device 121 of the host PC 102 receives, via the network 105 and the communication device 123, the user information and the profile information transmitted from the client PC 101 (S12).

The control device 121 of the host PC 102 controls the storage device 122 to store the user information (S13). In S13, the control device 121 determines whether or not a user identifier of one of pieces of individual user information contained in the user information matches one of user identifiers of pieces of individual user information which have been already stored in the storage device 122. In a case where the control device 121 determines that a user identifier of one of the pieces of individual user information contained in the user information matches one of the user identifiers of the pieces of individual user information which have been already stored in the storage device 122, the piece of individual user information having such one of the user identifiers which have been already stored in the storage device 122 is overwritten by the one of the pieces of individual user information, having such a user identifier, contained in the user information. In contrast, in a case where the control device 121 determines that a user identifier of one of the pieces of individual user information contained in the user information does not match any one of the user identifiers of the pieces of individual user information which have been already stored in the storage device 122, such one of the pieces of individual user information contained in the user information is newly registered in the storage device 122. The number of users is increased in the user information by the number of newly registered pieces of individual user information.

The control device 121 of the host PC 102 also controls the storage device 122 to store the profile information transmitted from the client PC 101 (S14). In S14, the control device 121 determines whether or not a profile identifier of one of pieces of individual profile information contained in the profile information matches one of profile identifiers of pieces of individual profile information which have been already stored in the storage device 122. In a case where the control device 121 determines that a profile identifier of one of the pieces of individual profile information contained in the profile information matches one of the profile identifiers of the pieces of individual profile information which have been already stored in the storage device 122, the piece of individual profile information having such one of the profile identifiers which have been already stored in the storage device 122 is overwritten by the one of the pieces of individual profile information, having such a profile identifier, contained in the profile information. In contrast, in a case where the control device 121 determines that a profile identifier of one of the pieces of individual profile information contained in the profile information does not match any one of the profile identifiers of the pieces of individual profile information which have been already stored in the storage device 122, such one of the pieces of individual profile information contained in the profile information is newly registered in the storage device 122. The number of profiles is increased in the profile information by the number of newly registered pieces of individual profile information.

The control device 121 of the host PC 102 notifies the client PC 101, via the communication device 123 and the network 105, that the user information and the profile information have been stored (S15).

The control device 111 of client PC 101 is notified, via the network 105 and the communication device 113, that the user information and the profile information have been stored in the host PC 102 (S16). The control device 111 controls the display device 115 of the client PC 101 to display the user information and the profile information having been transmitted to the host PC 102 (S17).

Figure 9:
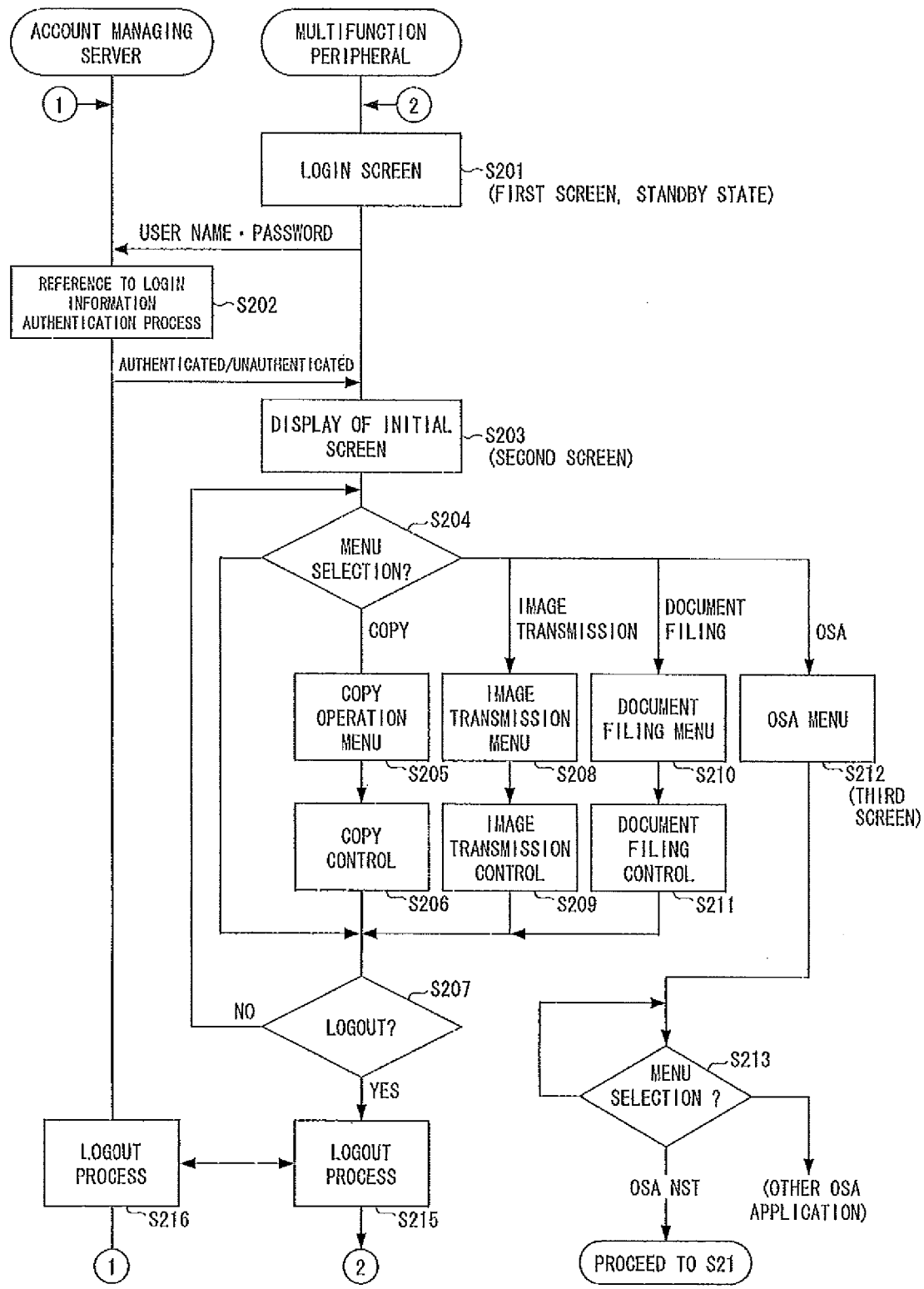
Figure 10:
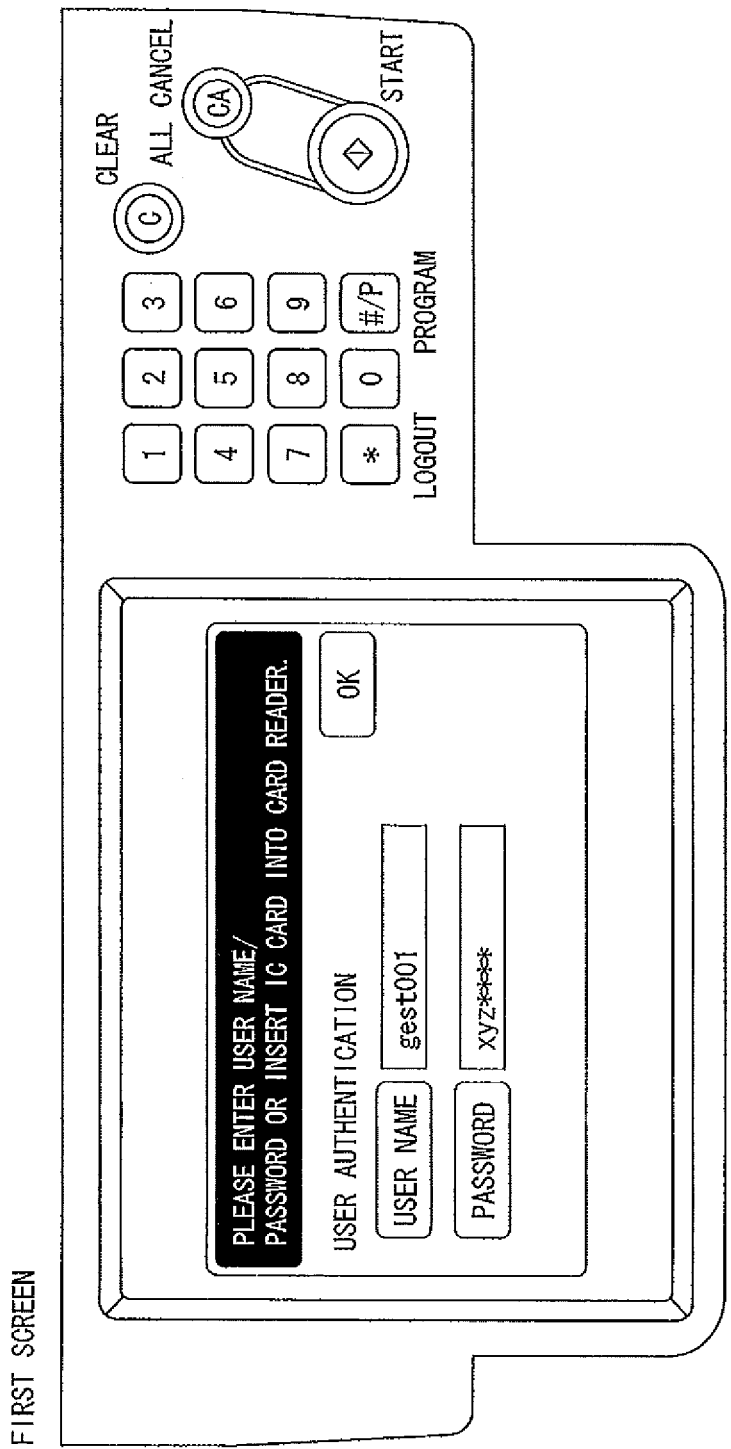
FIG. 10 is an explanatory view showing a first screen (login screen) displayed on a display device of the multifunction peripheral of FIG. 1 in S201 of FIG. 9.
Figure 11:
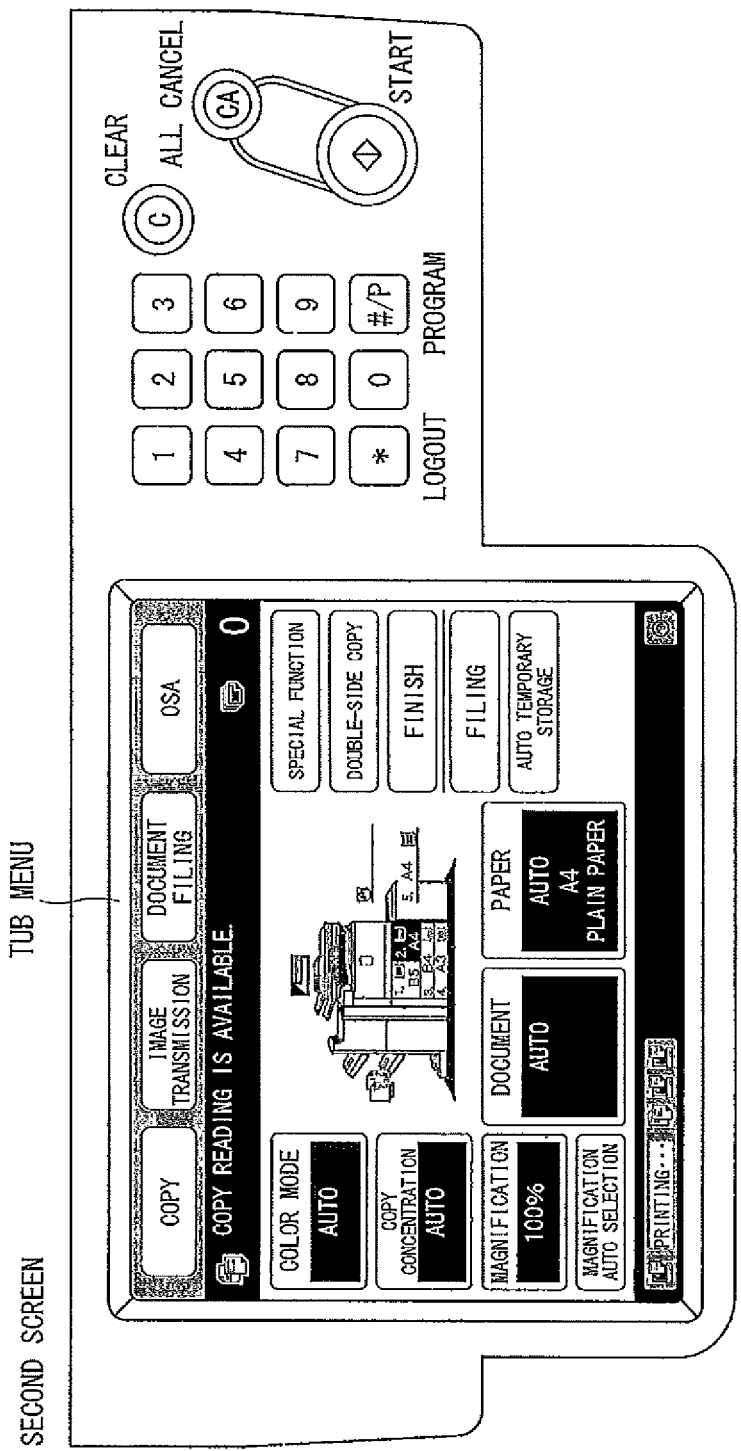
FIG. 11 is an explanatory view showing a second screen (initial screen) displayed on the display device of the multifunction peripheral of FIG. 1 in S203 of FIG. 9.
Figure 12:
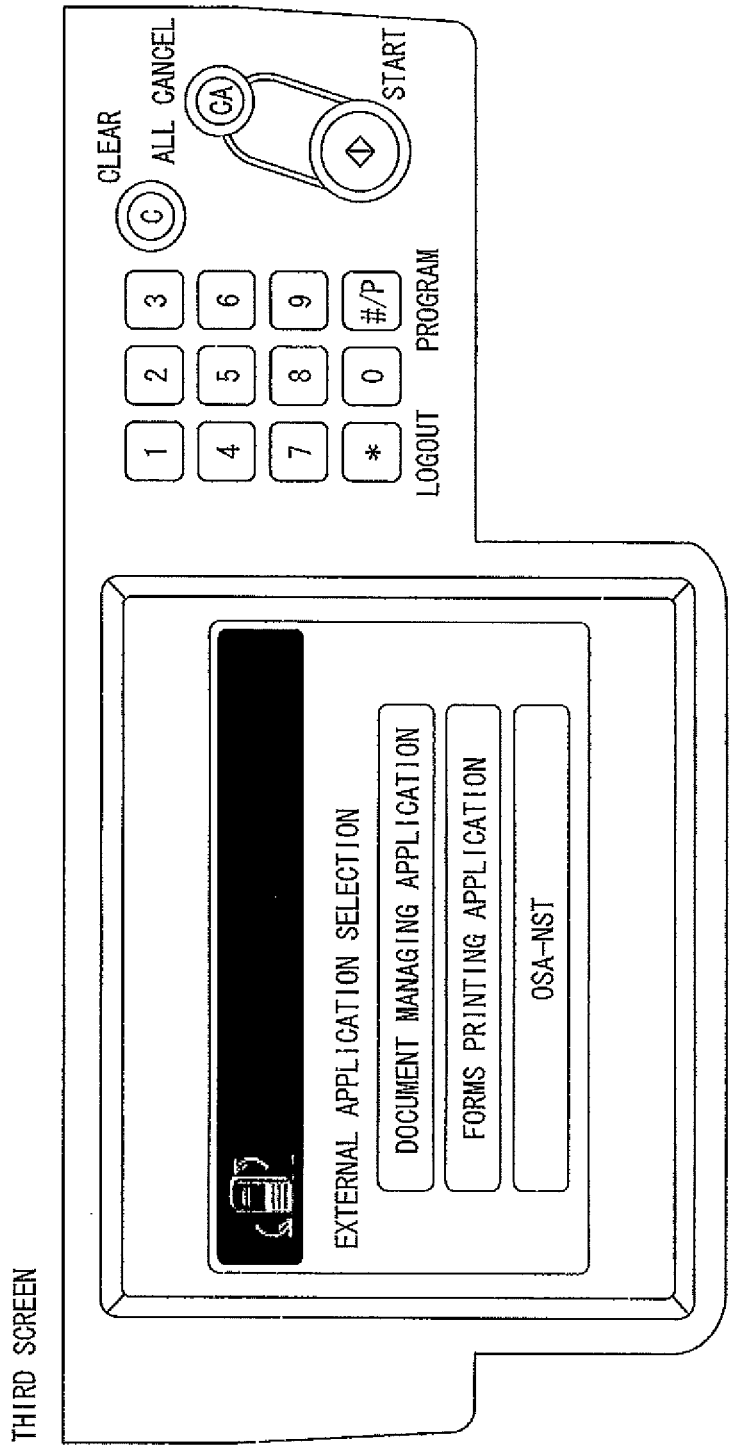
FIG. 12 is an explanatory view showing a third screen displayed on the display device of the multifunction peripheral of FIG. 1 in S212 of FIG. 9.

The following description will discuss how the account managing server 104 and the multifunction peripheral 103 operate when and after a user logs into the multifunction peripheral 103 that is standing by. FIG. 9 is a flowchart showing how the account managing server 104 and the multifunction peripheral 103 operate when and after a user logs into the multifunction peripheral 103 that is standing by. FIG. 10 is an explanatory view showing a first screen (login screen) displayed on the display device 135 of the multifunction peripheral 103 in S201 of FIG. 9. FIG. 11 is an explanatory view showing a second screen (initial screen) displayed on the display device 135 of the multifunction peripheral 103 in S203 of FIG. 9. FIG. 12 is an explanatory view showing a third screen displayed on the display device 135 of the multifunction peripheral 103 in S212 of FIG. 9.

According to the image processing system of the present embodiment, the account managing server 104 conducts a user authentication process with respect to login information inputted into the multifunction peripheral 103 while the multifunction peripheral 103 is standing by (later described). This causes a user who can use the multifunction peripheral 103 to be limited.

A user who wishes to use the multifunction peripheral 103 goes all the way to the multifunction peripheral 103 so as to log into the multifunction peripheral 103 by (i) manually entering a user name and a password via the first screen (login screen) (see FIG. 10) of the display device 135 or (ii) automatically entering the user name and the password by presenting, for example, an IC card (mobile information storage medium) to the multifunction peripheral 103 (S201).

The user name and the password, entered via the first screen (login screen), are transmitted from the multifunction peripheral 103 to the account managing server 104.

The account managing server 104 conducts a user authentication process with respect to the user name and the password received from the multifunction peripheral 103 (S202).

In the image processing system of the present embodiment, (i) login information (individual login information) is obtained from the client PC 101 connected to the network 105 and (ii) the login information is registered as provisional login information in the account managing server 104, in a case where the client PC 101 is authorized to be temporarily connected to the network 105. This allows even the client PC 101 (user), who is temporarily connected to the network 105 by use of the provisional login information, to use the multifunction peripheral 103 through the login in S201. Therefore, a manager of the account managing server 104 can easily manage the image processing system, instead of being troubled with a connection setting for a temporary user.

In a case where the account managing server 104 authorizes usage of the multifunction peripheral 103 in S202 (authenticated), the display device 135 of the multifunction peripheral 103 displays the second screen (initial screen) of FIG. 11 (S203). Note that a frequently used copy setting screen is generally set as the second screen (initial screen) of a default.

When a user selects one of COPY, IMAGE TRANSMISSION, DOCUMENT FILING, and OSA from a tab menu on the second screen (initial screen) (S204), an operation mode is changed into a selected operation mode.

The display device 135 of the multifunction peripheral 103 displays a copy menu, an image transmission menu or a document filing menu in accordance with the selected operation mode in S204 (S205, S208 and S210).

When the user (i) selects desired one of the copy menu, the image transmission menu and the document filing menu and then (ii) pushes a start key, the multifunction peripheral 103 carries out a copy control, an image transmission control or a document filing control in accordance with the selected operation mode (S206, S209 and S211). When the user selects a logout process by pushing a "key (asterisk key)" (see FIG. 10) (S207), the multifunction peripheral 103 and the account managing server 104 conduct the logout process (S215 and S216), and then the multifunction peripheral 103 returns to a standby state.

When the user selects an OSA menu in S204, the display device 135 of the multifunction peripheral 103 displays the OSA menu on the third screen of FIG. 12 (S212).

Figure 13:
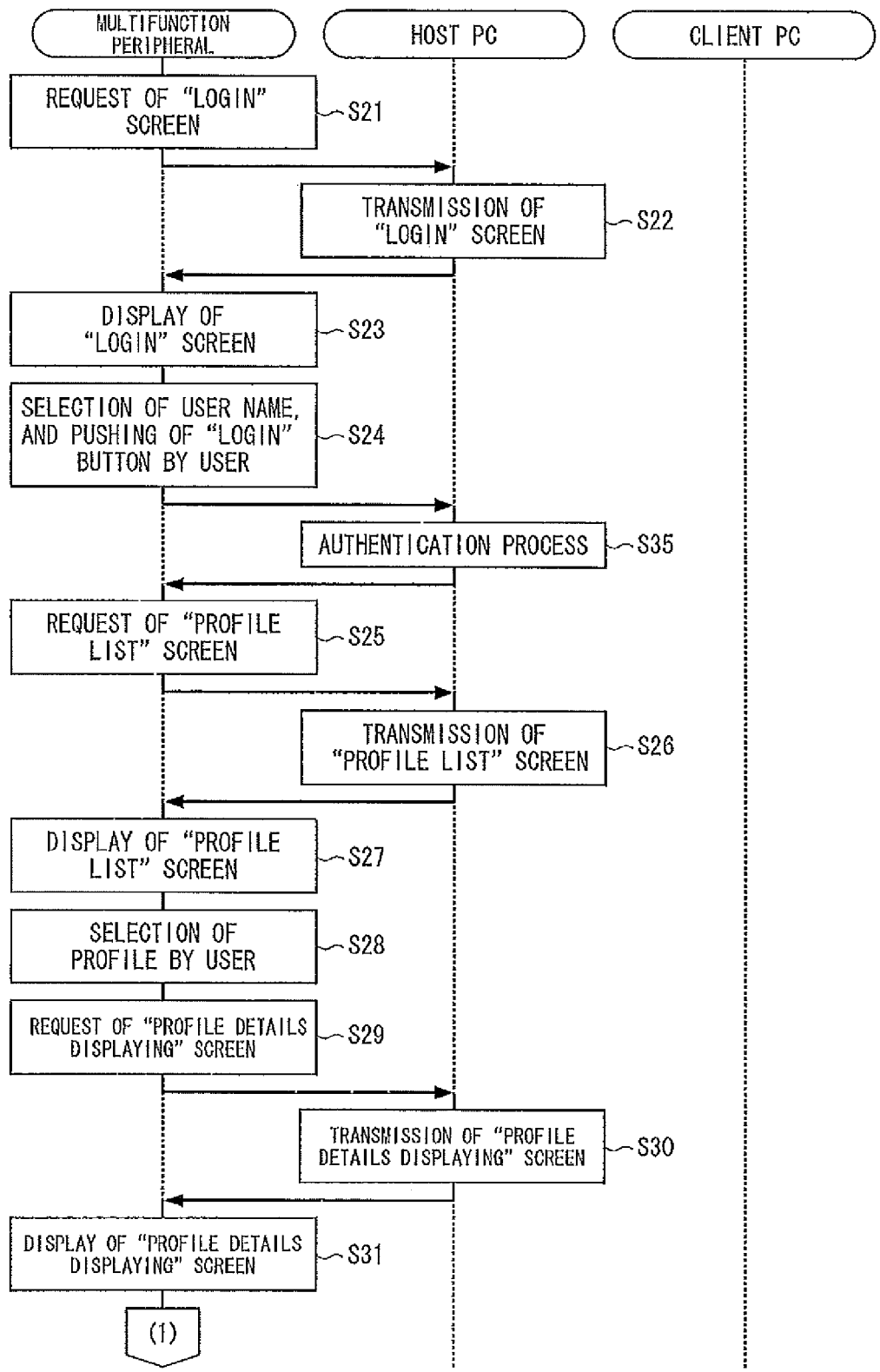
FIG. 13 is a flowchart showing a first part of an operation of the image processing system of FIG. 1 from logging into the image processing system until the ending of the scanning.

When "OSA NST" is selected on the third screen (S213), the multifunction peripheral 103 conducts a process of S21 of FIG. 13. "OSA NST" is executed in processes conducted after the process of S21. The display device 135 of the multifunction peripheral 103 changes displaying from FIGS. 16 to 17 in accordance with a user's login operation.

Figure 14:
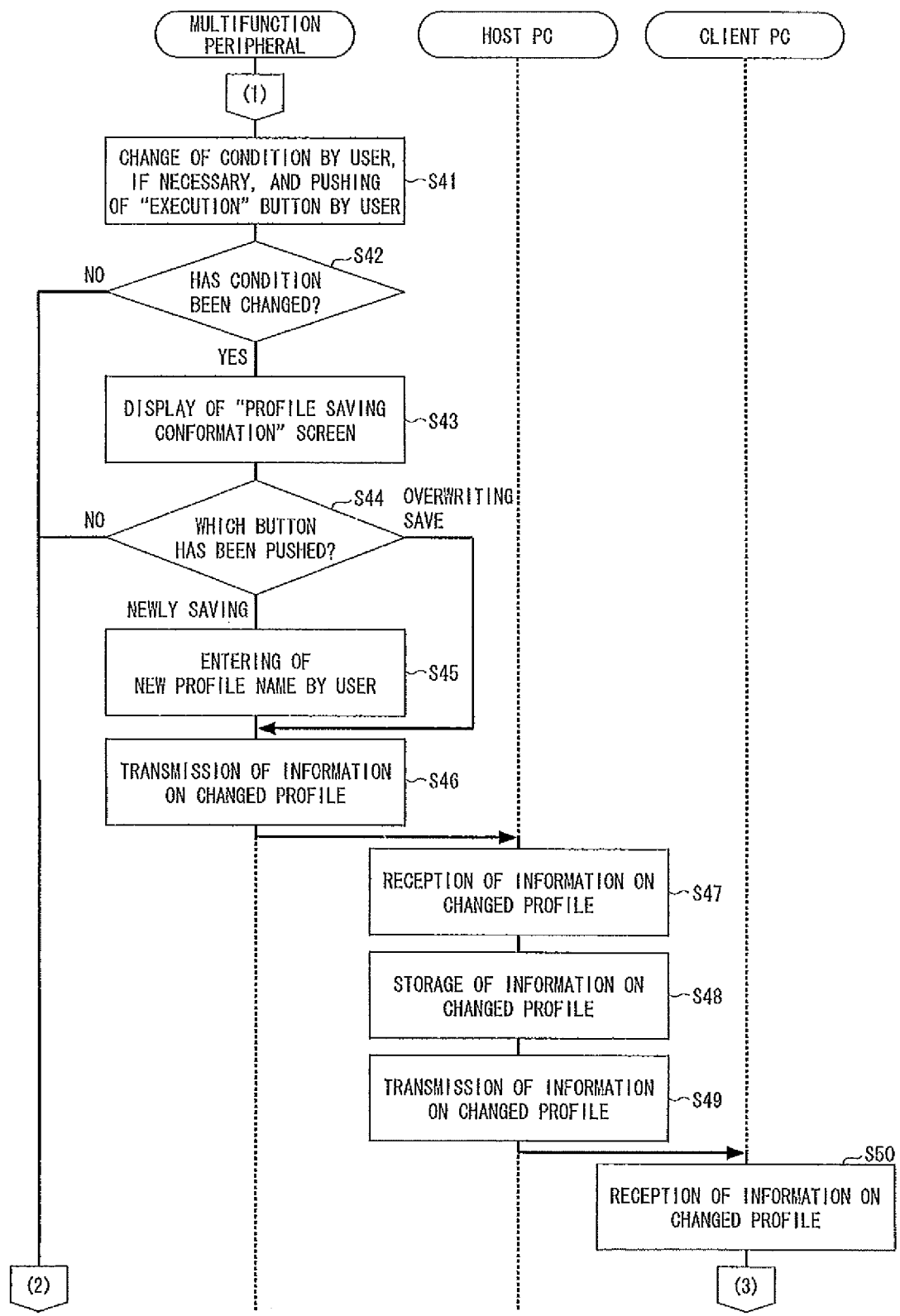
FIG. 14 is a flowchart showing a second part of the operation of the image processing system of FIG. 1 from logging into the image processing system until the ending of the scanning, which second part follows the first part illustrated in FIG. 13.
Figure 15:
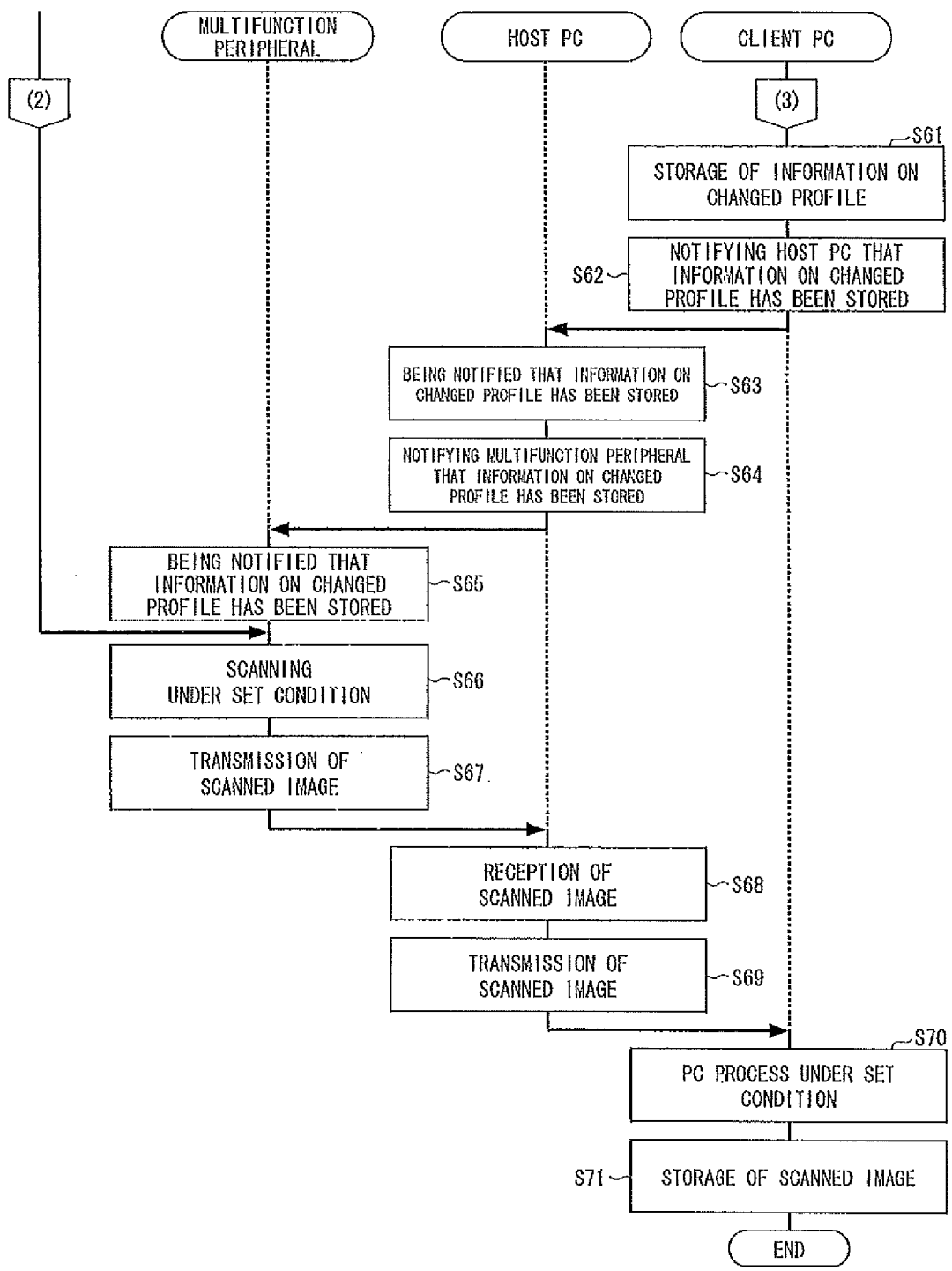
FIG. 15 is a flowchart showing a third part of the operation of the image processing system of FIG. 1 from logging into the image processing system until the ending of the scanning, which third part follows the second part illustrated in FIG. 14.

The following description will discuss, with reference to FIGS. 13 through 19, how the image processing system operates from the logging of a user into the image processing system until scanning is ended. FIG. 13 is a flowchart showing a first part of the operation of the image processing system from the logging of the user into the image processing system until the ending of the scanning. FIG. 14 is a flowchart showing a second part of the operation of the image processing system, which second part follows the first part shown in FIG. 13. FIG. 15 is a flowchart showing a third part of the operation of the image processing system, which third part follows the second part shown in FIG. 14.

Figure 16:
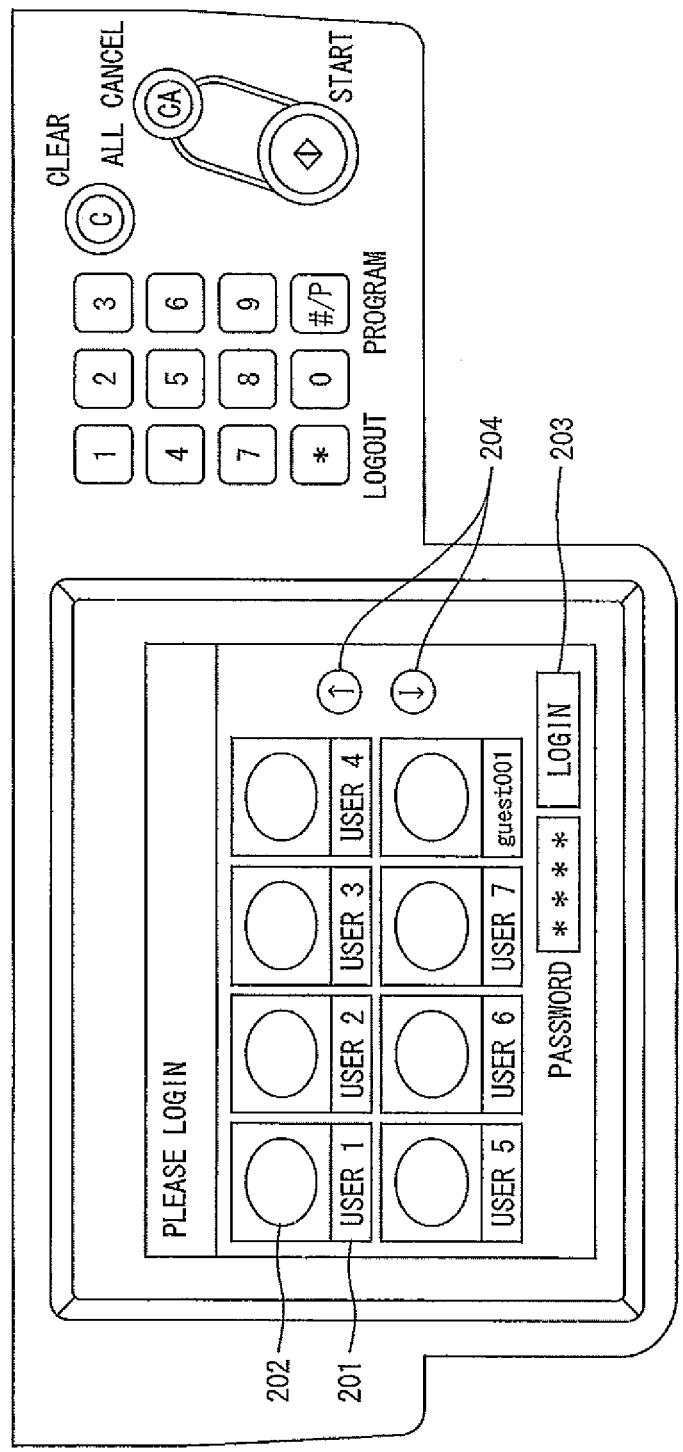
FIG. 16 is an explanatory view showing a login screen displayed on the display device of the multifunction peripheral of FIG. 1 in S23 of FIG. 13.
Figure 17:
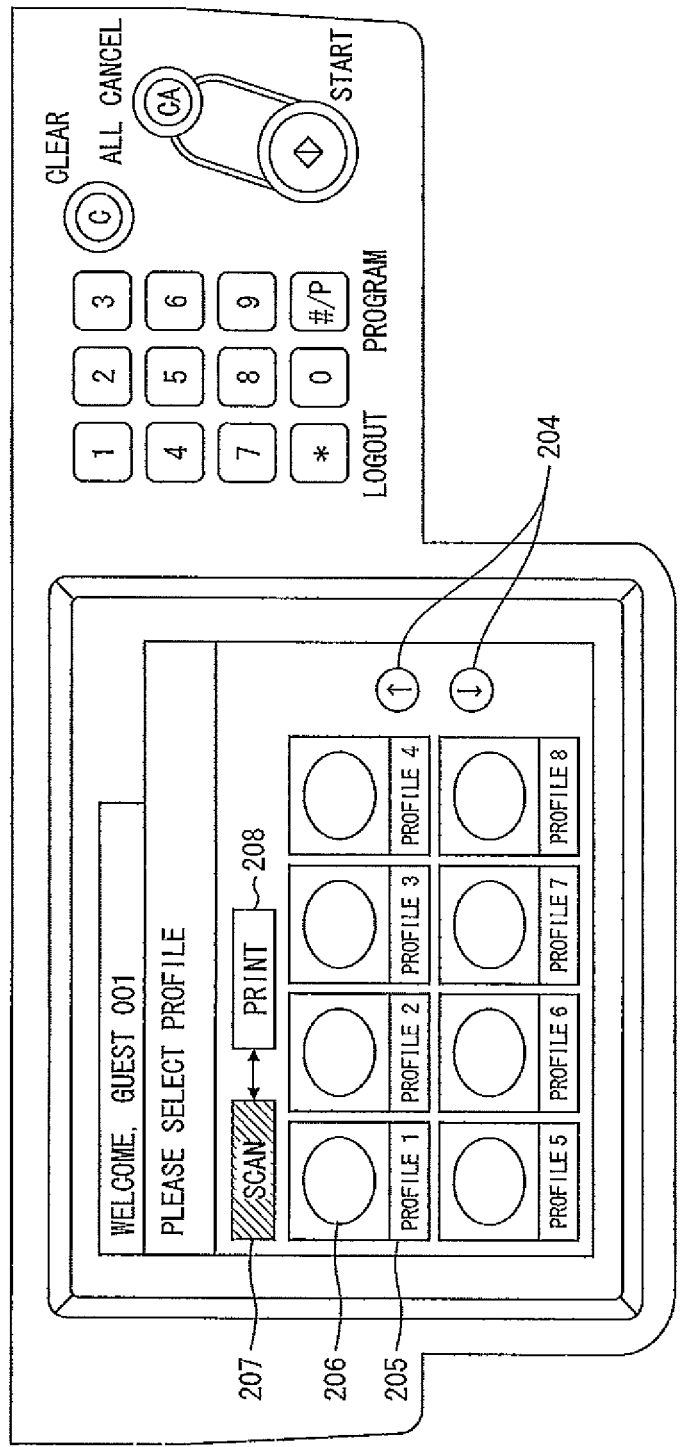
FIG. 17 is an explanatory view showing a profile list screen displayed on the display device of the multifunction peripheral of FIG. 1 in S27 of FIG. 13.

FIG. 16 is an explanatory view showing a login screen displayed in S23 of FIG. 13. FIG. 17 is an explanatory view showing a profile list screen displayed in S27 of FIG. 13. FIG. 18 is an explanatory view showing a detail displaying screen, of a profile, displayed in S31 of FIG. 13, FIG. 19 is an explanatory view showing a saving confirmation screen, of a profile, displayed in S43 of FIG. 14.

The multifunction peripheral 103 controls the display device 135 to display the login screen of FIG. 16, when a user pushes a predetermined button for logging into the image processing system while the display device 135 of the multifunction peripheral 103 is displaying a home screen.

In response to the user pushing the predetermined button for login, the control device 131 of the multifunction peripheral 103 requests, via the communication device 133 and the network 105, the host PC 102 to transmit data for displaying the login screen (S21).

The control device 121 of the host PC 102 receives a request for the data for displaying the login screen from the multifunction peripheral 103 via the network 105 and the communication device 123. In response to the request, the control device 121 of the host PC 102 transmits the data for displaying the login screen to the multifunction peripheral 103, via the communication device 123 and the network 105 (822).

Upon receipt of the data for displaying the login screen from the host PC 102 via the network 105 and the communication device 133, the control device 131 of the multifunction peripheral 103 controls the display device 135 to display the login screen of FIG. 16 (823).

When the user (i) specifies, via the input device 134, a user name and a password on the login screen displayed by the display device 135 and then (ii) pushes a login button 203 (S24), the host PC 102 conducts an authentication process in which whether or not a password corresponding to the user name is entered is authenticated (S35). In a case where it is authenticated that the password corresponding to the user name is entered, the control device 131 of the multifunction peripheral 103 requests, via the communication device 133 and the network 105, the host PC 102 to transmit data for displaying a profile list screen (S25).

The control device 121 of the host PC 102 receives a request for the data for displaying the profile list screen, via the network 105 and the communication device 123. In response to the request, the control device 121 of the host PC 102 transmits, to the multifunction peripheral 103 via the communication device 123 and the network 105, the data for displaying the profile list screen including a list of profiles corresponding to a user identifier of the user name specified by the user (S26).

The control device 131 of the multifunction peripheral 103 receives the data for displaying the profile list screen, via the network 105 and the communication device 133. In response to the data for displaying the profile list screen, the control device 131 of the multifunction peripheral 103 controls the display device 135 to display the profile list screen of FIG. 17 (S27).

When the user selects, via the input device 134, a profile on the profile list screen displayed by the display device 135 (S28), the control device 131 of the multifunction peripheral 103 requests, via the communication device 133 and the network 105, the host PC 102 to transmit data for displaying a detail displaying screen of the profile selected by the user (S29).

The control device 121 of the host PC 102 receives a request for the data for displaying the detail displaying screen of the profile, via the network 105 and the communication device 123. In response to the request, the control device 121 of the host PC 102 transmits, to the multifunction peripheral 103 via the communication device 123 and the network 105, the data for displaying the detail displaying screen of the profile which includes profile information corresponding to a profile identifier of the profile selected by the user (S30).

The control device 131 of the multifunction peripheral 103 receives the data for displaying the detail displaying screen of the profile, via the network 105 and the communication device 133. In response to the data for displaying the detail displaying screen of the profile, the control device 131 of the multifunction peripheral 103 controls the display device 135 to display the detail displaying screen of the profile shown in FIG. 18 (S31).

Subsequently, if necessary, the user changes, on the detail displaying screen of the profile displayed by the display device 135, a scanning condition and/or a printing condition via the input device 134, and then pushes an execution button 209 (see S41 of FIG. 14). Note that the detail displaying screen of the profile shown in FIG. 18 exemplifies a scanning condition.

Subsequently, the control device 131 determines whether or not the scanning condition and/or the printing condition are/is changed (S42). In a case where the control device 131 determines that neither the scanning condition nor the printing condition is changed, the multifunction peripheral 103 proceeds to S66 (see FIG. 15). In contrast, in a case where the control device 131 determines that at least one of the scanning condition and the printing condition is changed, the multifunction peripheral 103 proceeds to S43.

In a case where the control device 131 determines in S42 that at least one of the scanning condition and the printing condition is changed, the control device 131 of the multifunction peripheral 103 controls the display device 135 to display the saving confirmation screen of the profile shown in FIG. 19 (S43).

When the user pushes one of a NO button 210, an OVER-WRITING SAVE button 211 and a NEWLY SAVING button 212 on the saving confirmation screen of the profile displayed by the display device 135, the control device 131 determines which button has been pushed (S44). In a case where the control device 131 determines that the NO button 210 has been pushed, the multifunction peripheral 103 proceeds to S66 (see FIG. 15). In a case where the control device 131 determines that the OVERWRITING SAVE button 211 has been pushed, the multifunction peripheral 103 proceeds to S46. In a case where the control device 131 determines that the NEWLY SAVING button 212 has been pushed, the multifunction peripheral 103 proceeds to S45.

When the control device 131 of the multifunction peripheral 103 determines in S44 that the NEWLY SAVING button 212 has been pushed, the control device 131 of the multifunction peripheral 103 controls the display device 135 to display a screen which urges the user to enter a new profile name. When the user enters the new profile name via the input device 134 in response to the urging, the new profile name is used as the name of a changed profile (S45).

Subsequently, the control device 131 of the multifunction peripheral 103 transmits information on the changed profile to the host PC 102, via the communication device 133 and the network 105 (S46).

The control device 121 of the host PC 102 receives the information on the changed profile, via the network 105 and the communication device 123 (S47). Upon receipt of the information on the changed profile, the control device 121 of the host PC 102 (i) controls the storage device 122 to store the information on the changed profile (S48) and (ii) transmits the information on the changed profile to the client PC 101 via the communication device 123 and the network 105 (S49).

Upon receipt of the information on the changed profile via the network 105 and the communication device 113 (S50), the control device 111 of the client PC 101 controls the storage device 112 to store the information on the changed profile (see S61 of FIG. 15).

Subsequently, the control device 111 of the client PC 101 notifies the host PC 102, via the communication device 113 and the network 105, that the information on the changed profile has been stored (S62).

The control device 121 of the host PC 102 is notified, via the network 105 and the communication device 123, that the information on the changed profile has been stored (S63). The control device 121 of the host PC 102 further notifies the multifunction peripheral 103, via the communication device 123 and the network 105, that the information on the changed profile has been stored (S64).

S64 causes the control device 131 of the multifunction peripheral 103 to be notified, via the network 105 and the communication device 133, that the information on the changed profile has been stored (S65).

The control device 131 of the multifunction peripheral 103 controls the image reading device 137 to scan under the scanning condition of the profile selected in S28, which scanning condition has been set in S41 (see FIG. 14) (S66). The control device 131 of the multifunction peripheral 103 further transmits, to the host PC 102 via the communication device 33 and the network 105, an image scanned by the image reading device 37, that is, a scanned image (S67).

The control device 121 of the host PC 102 receives the scanned image via the network 105 and the communication device 123 (S68). In response to the scanned image, the control device 121 of the host PC 102 transmits the scanned image to the client PC 101, via the communication device 123 and the network 105 (S69).

The control device 111 of the client PC 101 receives the scanned image, via the network 105 and the communication device 113. Upon receipt of the scanned image, the control device 111 of the client PC 101 conducts a process (PC process) under a condition of the profile selected in S28, which condition has been set in S41 (see FIG. 14) (S70), and then controls the storage device 112 to store the scanned image that has been subjected to the process (PC process) (S71).

Note that the multifunction peripheral 103 controls the display device 135 to (i) initially display the home screen in response to the multifunction peripheral 103 being turned on and then (ii) display the login screen of FIG. 16 in response to a user pushing the predetermined button for logging into the image processing system. Note also that the predetermined button is a button which has been assigned to the image processing system by, e.g., pre-registration of the button. The login screen displays (i) user names 201 of respective users registered in the host PC 102 and (ii) user icons 202 indicative of the respective users. Note that user names 201 and user icons 202 that are not displayed on the login screen of FIG. 16 can be displayed by pushing an up arrow scroll button 204 or a down arrow scroll button 204.

When (i) a user of the multifunction peripheral 103 correctly specifies a user name and a password on the login screen and then (ii) pushes a login button 203, a profile list screen related to a specified user is displayed as illustrated in FIG. 17. Note that, in a case of the profile list screen of FIG. 17, a scanning selection button 207 is highlighted by having been pushed. In other words, a scan profile indicative of a scanning condition under which the image reading device 137 of the multifunction peripheral 103 scans is selected on the profile list screen of FIG. 17.

Note also that, in the present embodiment, the user of the multifunction peripheral 103 is basically a user of the client PC 101. The user of the multifunction peripheral 103 can be identified as the user of the client PC 101 by successful logging of the user of the client PC 101 into the multifunction peripheral 103 on the login screen of FIG. 16.

The profile list screen of FIG. 17 displays (i) profile names 205 of profiles correlated with the user name specified on the login screen of FIG. 16 and (ii) profile icons 206 indicative of the respective profiles. The profile list screen of FIG. 17 also displays (a) the scanning selection button 207 for selecting a scanning mode and (b) a printing selection button 208 for selecting a printing mode. Specifically, a user can select, on the profile list screen of FIG. 17, (i) the scan profile or a print profile and (ii) one of a plurality of pre-registered profiles (e.g., profiles 1 through 8) for each of the scan profile and the print profile.

When the user selects, on the profile list screen of FIG. 17, a target profile, the detail displaying screen of the target profile (a detail displaying screen of information on conditions under which a process is conducted) is displayed (see FIG. 18). The detail displaying screen of the profile shown in FIG. 18 displays a scanning condition of, a printing condition of, or a PC processing condition (information on conditions under which an additional process is conducted) of the profile selected on the profile list screen of FIG. 17. FIG. 18 illustrates an example of the detail displaying screen of the profile which is displayed in a case where, on the profile list screen of FIG. 17, (i) the scan profile has been selected and (ii) one of, for example, the profiles 1 through 8 has been selected. The user of the multifunction. peripheral 103 can confirm and/or change the scanning condition, the printing condition, and the PC processing condition (e.g., conditions under which the client PC 101 conducts a process) of the multifunction peripheral 103, by operating the detail displaying screen of the profile shown in FIG. 18.

Scanning or printing operation is conducted, when the user pushes the execution button 209, on the detail displaying screen of the profile shown in FIG. 18, without having changed any of the scanning condition, the printing condition, and the PC processing condition. In contrast, the saving confirmation screen of the profile of FIG. 19 is displayed, when the user pushes the execution button 209 after having changed at least one of the scanning condition, the printing condition, and the PC processing condition.

When the user pushes the NO button 210 on the saving confirmation screen of the profile, the scanning or the printing operation is conducted. When the user pushes the OVERWRITING SAVE button 211, changed results are reflected in a corresponding profile stored in each of the storage device 112 of the client PC 101 and the storage device 122 of the host PC 102. When the user pushes the NEWLY SAVING button 212, changed results are stored as a new profile in each of the storage device 112 of the client PC 101 and the storage device 122 of the host PC 102.

According to the image processing system of the present embodiment, the multifunction peripheral 103 thus creates, edits, and deletes the scan profile and the print profile, in response to an operation conducted by a user. The scan profile and the print profile which have been created or edited by the multifunction peripheral 103 are transmitted from the multifunction peripheral 103 to the host PC 102. The host PC 102, in turn, transmits the scan profile and the print profile to the client PC 101. This causes the host PC 102 and the client PC 101 to store the scan profile and the print profile.

The profile information (see FIG. 4) and the user information (see FIG. 5) are created by the client PC 101 or the host PC 102 by use of a profile received from the multifunction peripheral 103, and are then stored in the client PC 101 and the host PC 102.

In a case where the client PC 101 is connected to the host PC 102 of the image processing system, the profile information and the user information of the client PC 101 are transmitted to the host PC 102 so as to be stored in the host PC 102 (see FIG. 8). Therefore, in a case where the client PC 101 is disconnected from a first image processing system so as to be connected to a second image processing system, the profile information and the user information of the client PC 101 are stored in a host PC 102 of the second image processing system.

Even in a case where the client PC 101 is disconnected from the first image processing system so as to be connected to the host PC 102 of the second image processing system, it is possible to use a profile that has been stored in the first image processing system even in the second image processing system. This allows the second image processing system to swiftly conduct scanning and printing operations by use of an existing scan profile in which a scanning condition has been set and an existing print profile in which a printing condition has been set.

Figure 28:
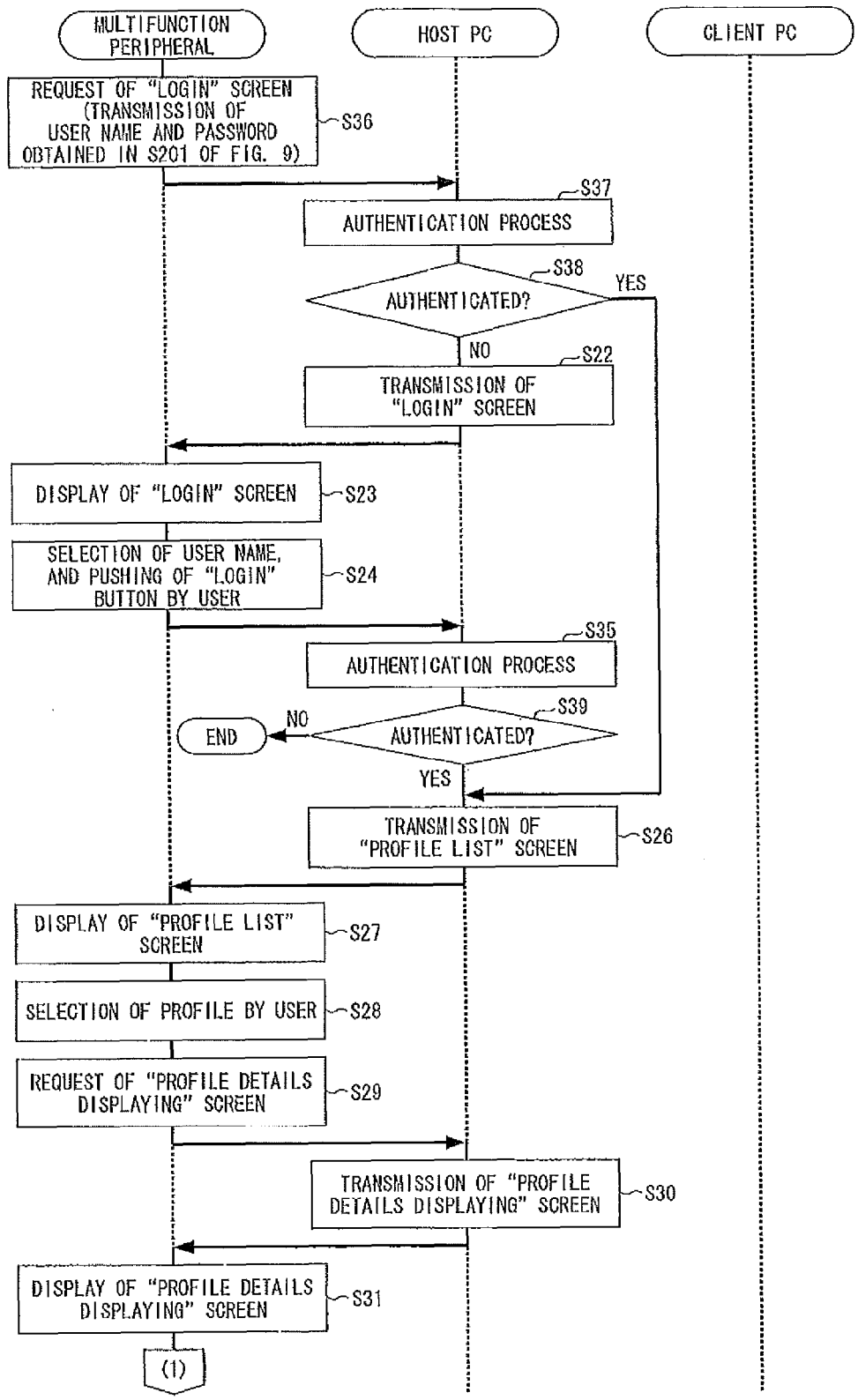
FIG. 28 is a flowchart showing how a login process is conducted at a single process in the front operation of FIG. 13 (single sign on).

Note that a login process illustrated in FIG. 13 can be conducted at a single process (single sign on), as shown in FIG. 28. FIG. 28 is a flowchart showing how the login process illustrated in FIG. 13 is conducted at such a single process (single sign on).

According to the flowchart shown in FIG. 28, when a user pushes the predetermined button for logging into the image processing system, the control device 131 of the multifunction peripheral 103 requests, via the communication device 133 and the network 105, the host PC 102 to transmit the data for displaying the login screen, and transmits, to the host PC 102, the user name and the password obtained in S201 of FIG. 9 (S36).

Upon receipt, from the multifunction peripheral 103, of (i) a request for the data for displaying the login screen, (ii) the user name, and (iii) the password, the control device 121 of the host PC 102 conducts an authentication process based on the user name and the password (S37). In S37, the control device 121 of the host PC 102 determines whether or not the user name and the password are pre-registered.

The control device 121 of the host PC 102 proceeds to S26, in a case where the control device 121 of the host PC 102 determines in S37 that the user name and the password (the user name and the password obtained by the multifunction peripheral 103 in S201 of FIG. 9) are pre-registered (authenticated) (S38). That is, the control device 121 of the host PC 102 transmits, to the multifunction peripheral 103 via the communication device 123 and the network 105, the data for displaying the profile list screen which data includes the list of profiles corresponding to the user identifier of the user. After S26, the operation described with reference to FIG. 13 is conducted.

In contrast, the control device 121 of the host PC 102 proceeds to S22, in a case where the control device 121 of the host PC 102 determines in S37 that the user name and the password (the user name and the password obtained by the multifunction peripheral 103 in S201 of FIG. 9) are not pre-registered (unauthenticated) (S38). In S22, the control device 121 of the host PC 102 transmits the data for displaying the login screen to the multifunction peripheral 103. After S22, the multifunction peripheral 103 conducts S23 and S24. After S24, the host PC 102 conducts the authentication process in which whether or not the password corresponding to the user name specified by the user is entered (S35). In a case where the host PC 102 determines that the password corresponding to the user name specified by the user has been entered (S39), the host PC 102 proceeds to S26. After S26, the operation described with reference to FIG. 13 is conducted. In contrast, in a case where the host PC 102 determines that the password corresponding to the user name specified by the user has not been entered (S39), no further step is proceeded to.

As described above, in the operation illustrated in FIG. 28, the login process can be conducted at a single process (single sign on) without proceeding to S22 through S24, S35 and S39, in a case where the settings of a user name and a password which are to be registered in the multifunction peripheral 103 are identical to the settings of a user name and a password to be registered in the host PC 102.

Note that the client PC 101 of the image processing system of the present embodiment can have at least one of (i) a function of creating and adding a scan profile or a print profile and (ii) a function of editing (modifying) and deleting a scan profile or a print profile which are stored in the storage device 112 of the client PC 101. In this case, the client PC 101 can assign, to an added profile and a modified profile, a profile icon which is not assigned to any of the profiles that have been stored in the storage device 122 of the host PC 102. The following description will discuss an operation of the image processing system for the assignment.

Figure 20:
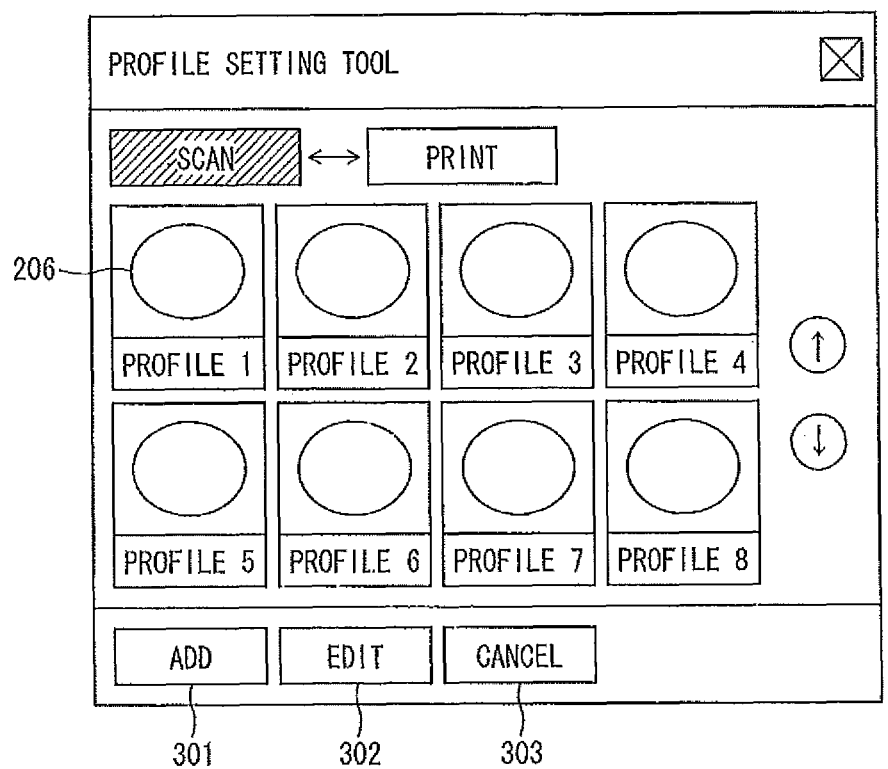
FIG. 20 is an explanatory view showing the first screen of a profile setting tool screen displayed on a screen of the client PC of FIG. 1, through which profile setting tool screen a profile is added or modified.
Figure 21:
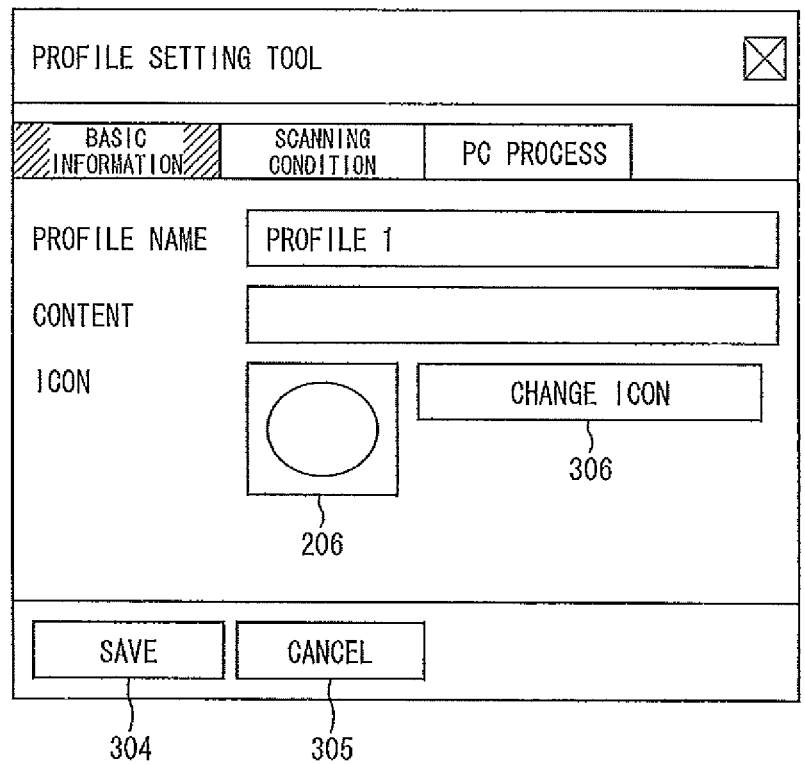
FIG. 21 is an explanatory view showing the second screen of the profile setting tool screen displayed on the screen of the client PC of FIG. 1, through which profile setting tool screen a profile is added or modified.
Figure 22:
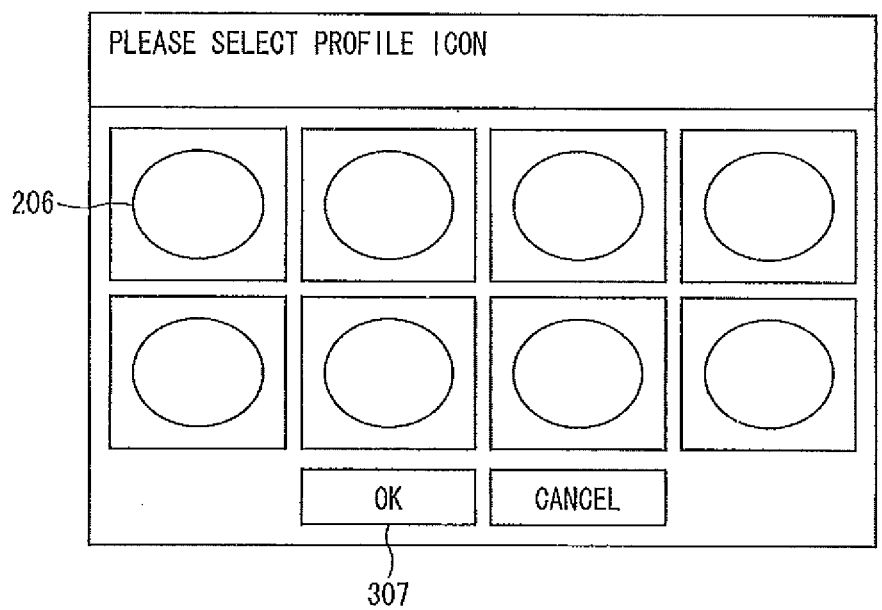
FIG. 22 is an explanatory view showing the third screen of the profile setting tool screen displayed on the screen of the client PC of FIG. 1, through which profile setting tool screen a profile is added or modified.

FIG. 20 is an explanatory view illustrating a first user interface (the first screen of a profile setting tool screen, an icon setting screen) via which a profile is to be added or modified. FIG. 21 is an explanatory view illustrating a second user interface (the second screen of the profile setting tool screen, an icon setting screen) via which a profile is to be added or modified. FIG. 22 is an explanatory view illustrating a third user interface (the third screen of the profile setting tool screen, an icon setting screen) via which a profile is to be added or modified. There occur transitions from the first screen through the second screen to the third screen.

The client PC 101 is configured so as to add or edit (modify) a scan profile or a print profile in response to a user's entering operation to the profile setting tool screen. In order to add or edit (modify) the scan profile or the print profile, the control device 111 of the client PC 101 requests, e.g., the host PC 102 to transmit data for displaying the profile setting tool screen so as to obtain the data for displaying the profile setting tool screen.

Subsequently, the control device 111 controls the display device 115 to display the first screen of the profile setting tool screen (see FIG. 20). The first screen displays (i) a plurality of profiles stored in the storage device 112 of the client PC 101 and (ii) respective profile icons.

On the first screen of the profile setting tool screen, a user pushes an Add button 301 or pushes, after selecting a profile to be modified, an Edit button 302. Alternatively, the user pushes a Delete button 303 after selecting a profile to be deleted.

For example, in a case where a user pushes the Edit button 302 after selecting a profile to be modified, the control device 111 of the client PC 101 controls the display device 115 to display the second screen of the profile setting tool screen (see FIG. 21). The user can set basic information of, a scanning condition of, and a PC processing condition of the profile to be modified on the second screen. When the user pushes a Save button 304, the basic information, the scanning condition, or the PC processing condition which has been set is stored. When the user pushes a Cancel button 305, the basic information, the scanning condition, or the PC processing condition which has been set is cancelled.

When the user pushes a Change Icon button 306, the control device 111 of client PC 101 controls the display device 115 to display the third screen of the profile setting tool screen (see FIG. 22). The third screen displays profile icons 206 each of which is not assigned to any of the profiles that have been stored in the storage device 122 of the host PC 102. The icon 206 which are displayed on the third screen are profile icons obtained by requesting the host PC 102 to transmit the profile icons which have been stored in the client PC 101 and in the host PC 102.

The user can select, as a profile icon 206 of a profile 1 (see FIG. 21), one of the profile icons 206 displayed on the third screen. The control device 111 of client PC 101 provisionally sets, as the profile icon 206 of the profile 1, the profile icon 206 selected by the user, when the user pushes an OK button 307 after selecting the profile icon 206.

Thereafter, the control device 111 controls the display device 115 to have a transition from the third screen to the second screen in the profile setting tool screen (see FIG. 21). The second screen displays the profile icon 206 selected by the user on the third screen (see FIG. 22). When the user pushes the Save button 304 on the second screen (see FIG. 21), the control device 111 controls the storage device 112 to store, as the profile icon 206 of the profile 1, the profile icon 206 that has been changed.

Note that information on the profile icon 206 stored in the storage device 112 is transmitted from the client PC 101 to the host PC 102, and is then stored in the storage device 122 of the host PC 102.

Figure 23:
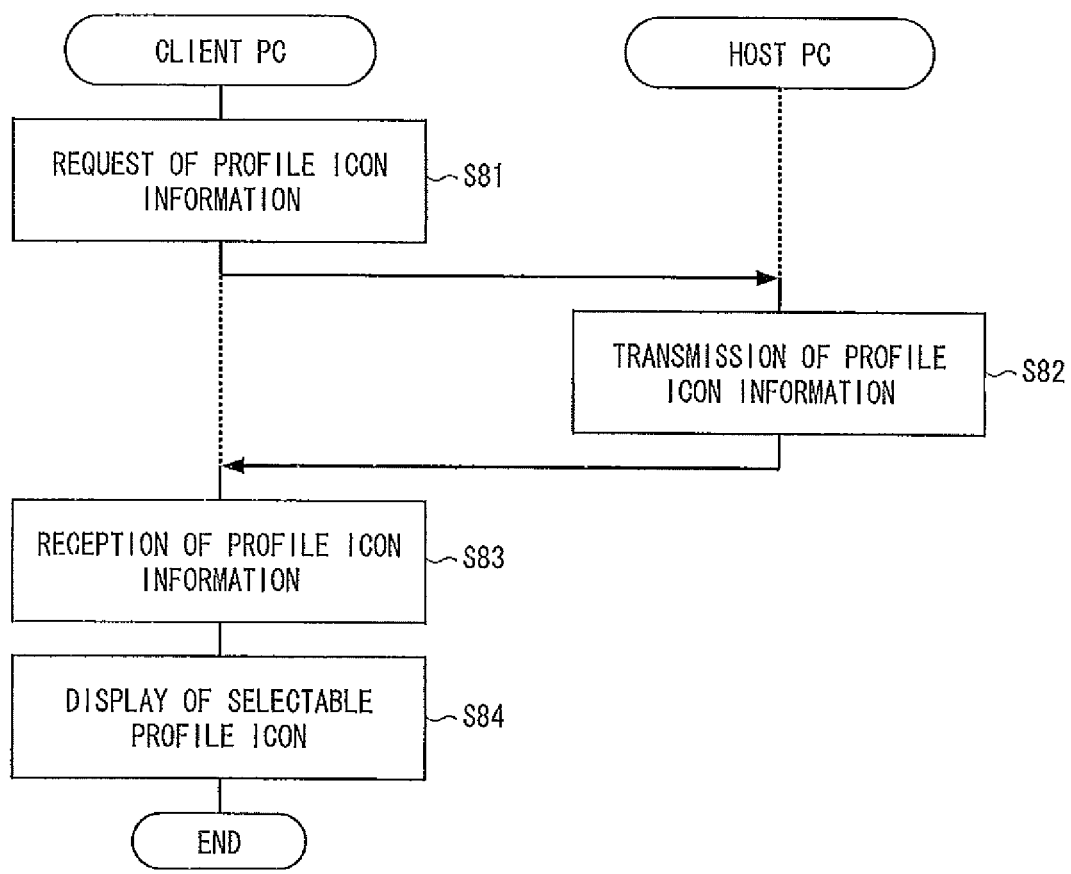
FIG. 23 is a flowchart showing how the client PC and the host PC operate when the third screen of the profile setting tool screen of FIG. 22 is displayed.

The following description will discuss how the client PC 101 and the host PC 102 operate when the third screen (see FIG. 22) of the profile setting tool screen is displayed. FIG. 23 is a flowchart showing how the client PC 101 and the host PC 102 operate when the third screen of the profile setting tool screen of FIG. 22 is displayed.

When a user pushes the Change Icon button 306 on the second screen (see FIG. 21) of the profile setting tool screen, the control device 111 of client PC 101 requests, via the communication device 113 and the network 105, the host PC 102 to transmit profile icon information (S81) (see FIG. 23).

The profile icon information is indicative of a list of profile icons (the profile icons 206 of FIG. 17) which correspond to the respective profiles stored in the storage device 122 of the host PC 102.

The control device 121 of the host PC 102 receives a request for the profile icon information, via the network 105 and the communication device 123. In response to the request, the control device 121 of the host PC 102 transmits, to the client PC 101 via the communication device 123 and the network 105, the profile icon information on the profiles stored in the storage device 122 (S82). This causes the control device 111 of client PC 101 to receive the profile icon information, via the communication device 113 and the network 105 (S83).

The control device 111 of client PC 101 controls the display device 115 to display, as selectable profile icons, all profile icons that (i) are stored in the storage device 112 and (ii) are not included in the profile icon information received from the host PC 102 (S84). The all profile icons are displayed on the third screen of the profile setting tool screen illustrated in FIG. 22.

According to the image processing system of the present embodiment, profile icons, which have not been assigned to any of the profiles stored in the storage device 122 of the host PC 102, are thus assigned to respective profiles each of which has been newly created (an added profile) or modified in the client PC 101. This makes it possible to assign different profile icons to the respective all profiles to be displayed on the display device 135 of the multifunction peripheral 103, even in a case where the all profiles are profiles each of which has been newly created or edited in the client PC 101. It is therefore possible to prevent a user from wrongly selecting a profile. Such a wrong selection is caused by assigning an identical profile icon to different profiles.

Note that, in the image processing system of the present embodiment, a scan profile can contain, in addition to a scan setting condition, a PC processing condition under which a scanned image scanned by the image reading device 137 of the multifunction peripheral 103 is processed. Similarly, a print profile can contain, in addition to a print setting condition, a PC processing condition under which print data to be transmitted from the client PC 101 or the host PC 102 to the multifunction peripheral 103 is processed.

The client PC 101 or the host PC 102 conducts the process with respect to the scanned image under the PC processing condition. The client PC 101 or the host PC 102 also conducts the process with respect to the print data under the PC processing condition. Therefore, at least one of the client PC 101 and the host PC 102 has a function of conducting, with respect to the scanned image, a process in accordance with the PC processing condition. At least one of the client PC 101 and the host PC 102 also has a function of conducting, with respect to the print data, a process in accordance with the PC processing condition. FIG. 15 shows an example of how the client PC 101 conducts a process under a PC processing condition.

FIG. 24 is an explanatory view schematically showing a data structure of a PC processing condition contained in profile information. As shown in FIG. 24, whether to conduct each of processes, such as (i) image skew correction, (ii) character recognition (OCR), (iii) image high compression (a process of reducing the size of an image file), and (iv) startup of an external application, is set in the PC processing condition. Further, the PC processing condition contains input parameters for the respective processes to be conducted. At least one of (a) the control device 111 of the client PC 101 and (b) the control device 121 of the host PC 102, has a function of conducting the processes in accordance with the PC processing condition.

FIG. 25 is a flowchart showing a PC process conducted by the client PC 101 in a case where a profile, selected by a user from the profile list screen of FIG. 17, contains a PC processing condition. The PC process is automatically conducted in the image processing system after operations conducted during a period of time from the start of the login operation (see FIG. 13) to the end of the scanning operation (see FIG. 15).

As shown in FIG. 25, the control device 111 of the client PC 101 reads out, from the storage device 122, a scanned image to be processed, in a case where the PC process is conducted under the PC processing condition contained in the profile (S101).

In a case where a skew correction is set, in the PC processing condition, to be conducted (S102), the control device 111 conducts the skew correction in accordance with a skew correction parameter indicated in the PC processing condition (S103).

In a case where a character recognition is set, in the PC processing condition, to be conducted (S104), the control device 111 conducts the character recognition in accordance with a character recognition parameter indicated in the PC processing condition (S105)

In a case where an image high compression is set, in the PC processing condition, to be conducted (S106), the control device 111 conducts the image high compression in accordance with an image high compression parameter indicated in the PC processing condition (S107).

The storage device 112 stores a file (scanned image data) which has been created by having been subjected to S103, S105 and S107 (S108).

In a case where the other application program is set, in the PC processing condition, to start up (S109), the control device 111 controls the other application program in accordance with an application startup parameter (S110).

According to the image processing system of the present embodiment, a profile also contains a PC processing condition under which, for example, the client PC 101 conducts a process. This allows the image processing system of the present embodiment to conduct a more advanced process.

Note that the present embodiment described the configuration in which the image processing system includes a single client PC 101, a single host PC 102, and a single multifunction peripheral 103 that are connected with one another via the network 105. However, the configuration of the image processing system is not limited to this. Alternatively, the image processing system can include a plurality of client PCs 101, a plurality of host PCs 102, and a plurality of multifunction peripherals 103. For example, the image processing system can be configured to include a plurality of client PCs 101, a single host PC 102, and a plurality of multifunction peripherals 103 that are connected to one another via the network 105. With the configuration, combinations, in each of which a corresponding one of the plurality of client PCs 101 and a corresponding one of the plurality of multifunction peripherals 103 are combined, simultaneously conduct the operations shown in FIGS. 13 through 15.

Note that the image processing system of the present embodiment is configured to independently include the client PC 101, the host PC 102, the multifunction peripheral 103, and the account managing server 104. However, the configuration of the image processing system of the present embodiment is not limited to this configuration. Alternatively, the image processing system of the present embodiment can be configured so that the host PC 102 and the account managing server 104 are provided in a single device, for example, a single PC.

Alternatively, the image processing system can be configured so that a first function of the multifunction peripheral 103, which first function can be used by a client PC 101 that is to be temporarily connected to the multifunction peripheral 103, is limited, as compared with a second function of the multifunction peripheral 103, which second function can be used by a normal client PC 101. Examples of such a limitation of function encompass a case where a printing function of the multifunction peripheral 103 that can print in full color is limited to merely monochrome printing.

Note that the first function of the multifunction peripheral 103, which first function can be used by the client PC 101, can be limited by the host PC 102, the multifunction peripheral 103, or the account managing server 104.

Figure 26:
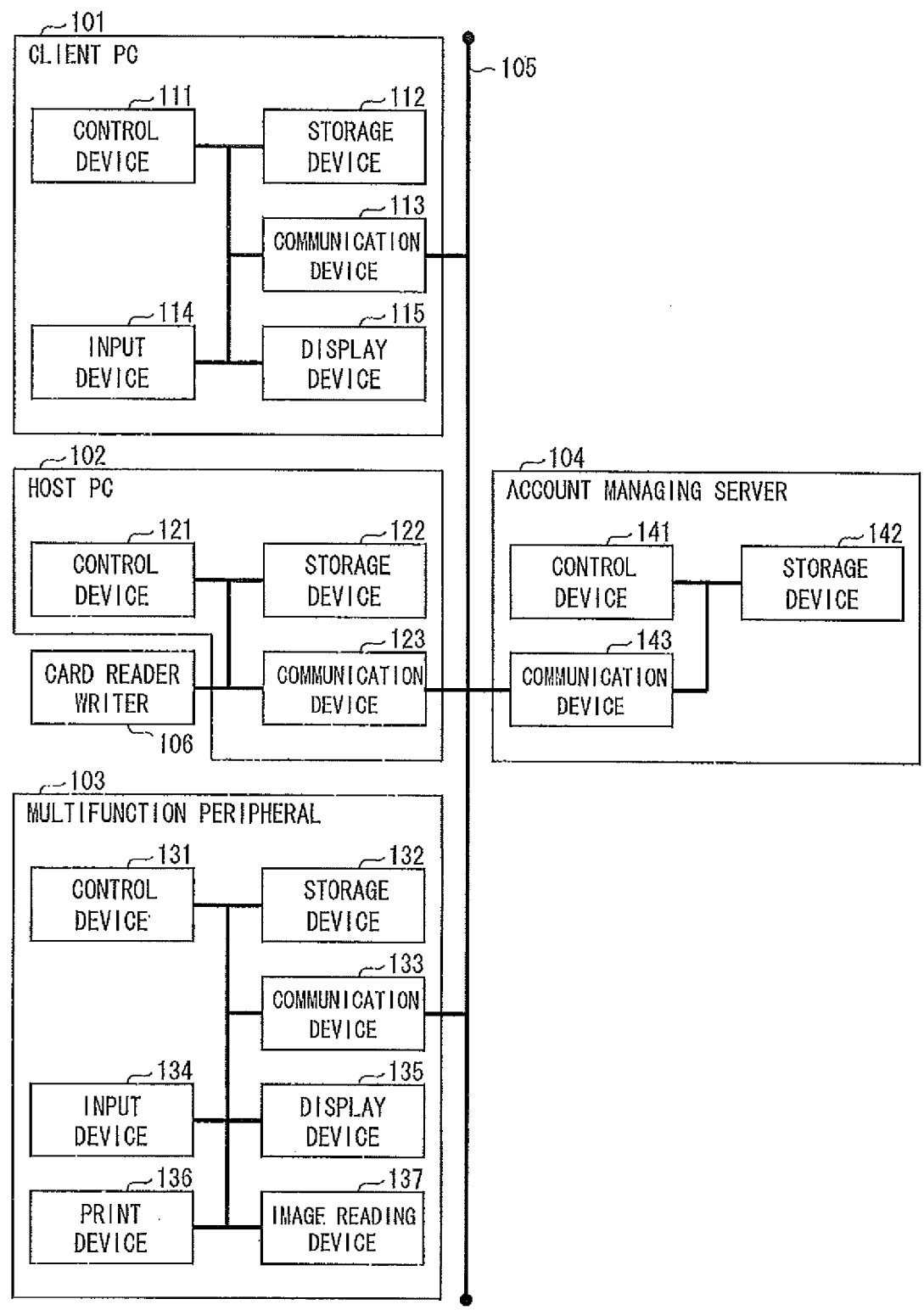
FIG. 26 is a block diagram showing another configuration of the image processing system of FIG. 1.
Figure 27:
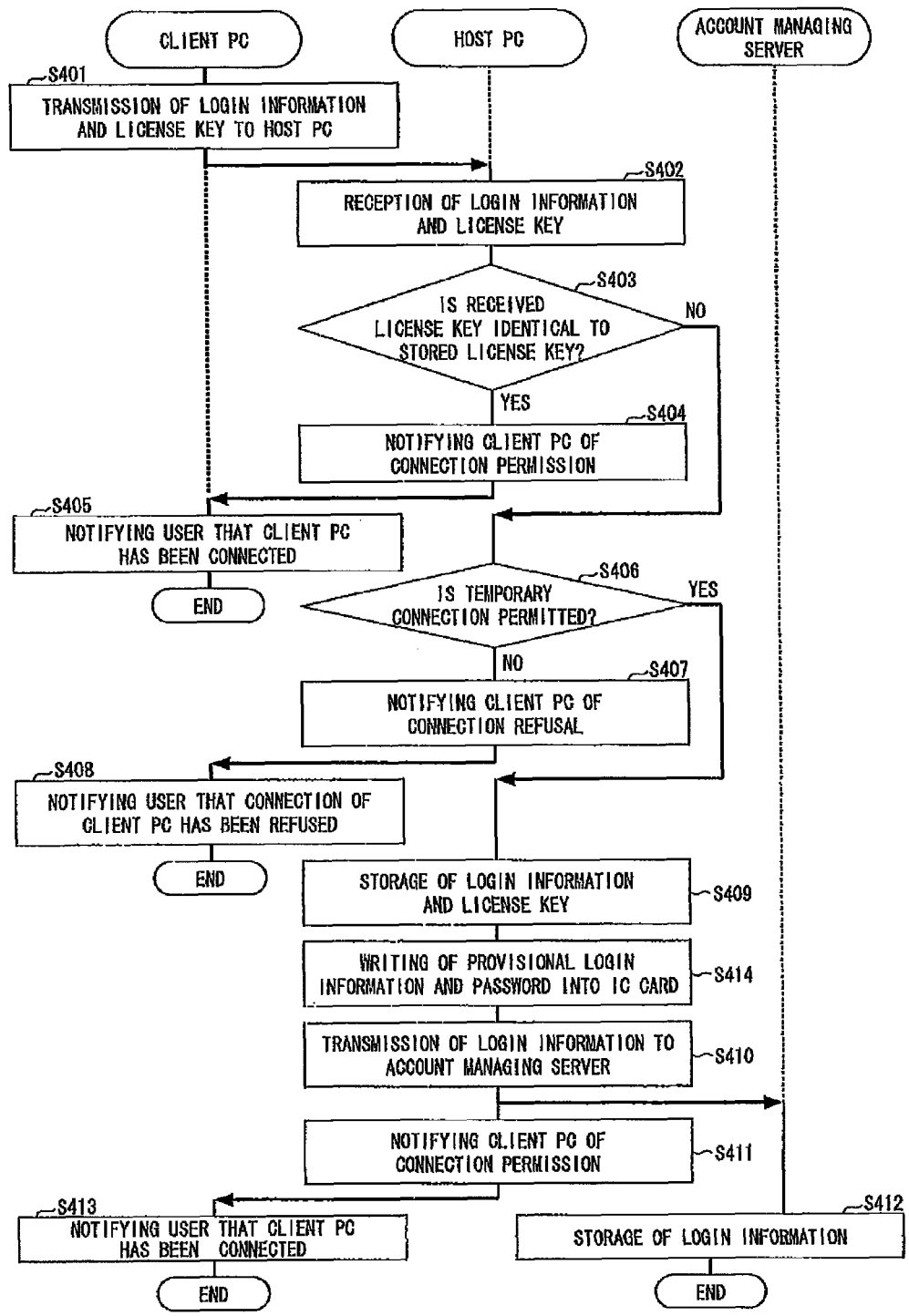
FIG. 27 is a flowchart showing an operation of the image processing system of FIG. 26.

Alternatively, the image processing system of the present embodiment can have a configuration of FIG. 26, and can conduct an operation of FIG. 27. FIG. 26 is a block diagram showing another configuration of the image processing system of FIG. 1. FIG. 27 is a flowchart showing an operation of an image processing system of FIG. 26.

FIG. 26 is different from FIG. 1 in that a card reader writer (an information writing device) 106 can be connected to the host PC 102 (see FIG. 26). FIG. 27 is different from FIG. 6 in that S414 is further proceeded to between S409 and S410 (see FIG. 27).

The image processing system of FIG. 26 is configured such that (i) the card reader writer 106 is connected to the host PC 102 and (ii) the control device 121 of the host PC 102 controls the card reader writer 106 to write authentication data into an IC card for multifunction peripheral authentication IC (mobile information storage medium).

Specifically, in S414 of FIG. 27, the control device 121 of the host PC 102 transmits, to the card reader writer 106, (i) provisional login information such as "guest" plus serial number and (ii) a login password, and then controls the card reader writer 106 to write, into an IC card for multifunction peripheral authentication, the provisional login information and the login password.

The IC card for multifunction peripheral authentication into which the provisional login information and the login password are written is used in a case where a guest user uses the multifunction peripheral 103. Specifically, a user who wishes to use the multifunction peripheral 103 goes all the way to the multifunction peripheral 103, and can automatically carry out the entering of the provisional login information and the login password with respect to the multifunction peripheral 103, by presenting the IC card for multifunction peripheral authentication to the multifunction peripheral 103 (S201). In this case, the multifunction peripheral 103 is configured to read the IC card for multifunction peripheral authentication.

According to the configuration, the card reader writer 106 writes the provisional login information and the login password into the IC card for multifunction peripheral authentication. Therefore, instead of manually entering the provisional login information and the login password in a case of using the multifunction peripheral 103, the guest user can automatically carry out the entering of the provisional login information and the login password with respect to the multifunction peripheral 103, by presenting the IC card for multifunction peripheral authentication to the multifunction peripheral 103. This allows the guest user to easily log into the multifunction peripheral 103.

Finally, each block of the client PC 101, the host PC 102, the multifunction peripheral 103, and the account managing server 104 in the image processing system can be realized by hardware or can be realized by software with the use of a CPU as below:

Each of the client PC 101, the host PC 102, the multifunction peripheral 103, and the account managing server 104 includes a CPU (central processing unit), a ROM (read only memory), a RAM (random access memory), and a storage device (recording medium) such as a memory. The CPU executes instructions in control programs for realizing each function. The ROM stores the control programs, the control programs are loaded on the RAM, and the storage device stores the control programs and various data. The objective of the present invention can also be achieved, by (i) loading, to each of the client PC 101, the host PC 102, the multifunction peripheral 103, and the account managing server 104, a computer-readable storage medium, in which program codes (executable program, intermediate code program or source program) of the control programs for respective of the client PC 101, the host PC 102, the multifunction peripheral 103, and the account managing server 104, each of which serves as software for realizing the foregoing respective functions, are stored and then (ii) causing the computer (or CPU or MPU) to retrieve and execute the program codes stored in the storage medium.

The storage medium can be, for example, a tape, such as a magnetic tape or a cassette tape; a disk including (i) a magnetic disk such as a floppy (Registered Trademark) disk or a hard disk and (ii) an optical disk such as CD-ROM, MO, MD, DVD or CD-R; a card such as an IC card (memory card) or an optical card; or a semiconductor memory such as a mask ROM, EPROM, EEPROM or flash ROM.

Alternatively, each of the client PC 101, the host PC 102, the multifunction peripheral 103, and the account managing server 104 can be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual dedicated network (virtual private network), telephone line network, mobile communications network or satellite communications network. The transfer medium which constitutes the communications network is not limited to a specific one, and therefore can be, for example, wired line such as IEEE 1394, USB, electric power line, cable TV line, telephone line or ADSL line; or wireless such as infrared radiation (IrDA, remote control), Bluetooth (Registered Trademark), 802.11 wireless, HDR, mobile telephone network, satellite line or terrestrial digital network. The present invention encompasses a carrier wave, in which computer data signal which is embodied by electronic transmission of the program codes, is embedded.

An account managing device of the present invention is an account managing device, to be connected to an image processing device and a client device via a network, the account managing device, including: a storage device; and a control section, the control section carrying out: (i) a first process in which the control section (a) obtains client identification information from the client device via the network and (b) controls the storage device to store, as provisional login information, first login information contained in the client identification information; (ii) a second process in which the control section (c) obtains second login information, which is inputted into the image processing device and is necessary for a usage of the image processing device; and (iii) a third process in which the control section (d) permits the usage of the image processing device in a case where the second login information is identical to the provisional login information stored in the storage device.

According to the configuration, the control section obtains the client identification information from the client device via the network, and controls the storage device to store, as the provisional login information, the first login information contained in the client identification information. The control section also obtains the second login information, which is inputted into the image processing device and is necessary for a usage of the image processing device. Further, the control section permits the usage of the image processing device in a case where the second login information is identical to the provisional login information stored in the storage device.

This configuration makes it unnecessary for a user to register login information of a client device newly connected to the network. Therefore, for example, a business traveler with a laptop that serves as a client device can be automatically permitted to use an image processing device.

Note that the provisional login information as which the first login information contained in the client identification information is stored includes provisional login information identical to login information contained in client identification information. Note also that the provisional login information as which the first login information contained in the client identification information is stored includes provisional login information obtained by modifying as appropriate login information contained in client identification information, such as provisional login information obtained by partially modifying login information contained in client identification information.

An image processing system of the present invention is an image processing system, in which an image processing device, a client device, a host device, and a managing device are connected to one another via a network, the host device including a control section, the control section of the host device (i) obtaining client identification information from the client device via the network and (ii) transmitting, as provisional login information to the managing device, first login information contained in the client identification information, the image processing device including a control section, the control section of the image processing device (i) accepting second login information for a usage of the image processing device and (ii) transmitting the second login information to the managing device, and the managing device including a control section and a storage device, the control section of the managing device (i) controlling the storage device of the managing device to store the provisional login information received from the host device and (ii) permitting the usage of the image processing device in a case where the second login information transmitted from the image processing device is identical to the provisional login information stored in the storage device of the managing device.

According to the configuration, the control section of the host device obtains the client identification information from the client device via the network, and transmits, as the provisional login information to the managing device, the first login information contained in the client identification information. The control section of the image processing device accepts the second login information for the usage of the image processing device, and transmits the second login information to the managing device. The control section of the managing device controls the storage device of the managing device to store the provisional login information received from the host device, and permits the usage of the image processing device in the case where the second login information transmitted from the image processing device is identical to the provisional login information stored in the storage device of the managing device.

This configuration makes it unnecessary for a user to register login information of a client device newly connected to the network. Therefore, for example, a business traveler with a laptop that serves as a client device can be automatically permitted to use an image processing device.

Note that the provisional login information as which the first login information contained in the client identification information is stored includes provisional login information identical to login information contained in client identification information. Note also that the provisional login information as which the first login information contained in the client identification information is stored includes provisional login information obtained by modifying as appropriate login information contained in client identification information, such as provisional login information obtained by partially modifying login information contained in client identification information.

The image processing system can be configured such that a function of the image processing device, which function can be used by the client device, is limited in a case where the provisional login information permits the image processing device to be used.

According to the configuration, the function of the image processing device, which function can be used by a business traveler with a laptop that serves as a client device, is limited. Therefore, a function of an image processing device, which function can be used by a client device that is normally registered in a managing device, can be distinguished from another function of the image processing device, which another function can be used by a client device that is provisionally registered in the managing device. Hence, it is possible to permit a temporarily connected client device to use the image processing device while the client device that is normally registered in the managing device keeps priority over the temporarily connected client device.

Note that the function of the image processing device, which function can be used by the client device, can be limited by the managing device, the host device or the image processing device.

The image processing system can be configured such that a setting as to whether to permit a provisional connection of the client device is carried out with respect to the control section of the host device.

According to the configuration, a user can carry out, with respect to the control section of the host device, the setting as to whether to permit the provisional connection of the client device. It is therefore possible to limit, in accordance with a security policy, a usage of the image processing device by a business traveler who brings, for example, a laptop that serves as a client device.

The image processing system can be configured such that the control section of the host device (i) monitors how the host device and the client device are communicated with each other and (ii) transmits the first login information of the client device to the managing device as candidate login information to be deleted in a case where the host device and the client device do not communicate with each other for a certain period of time, and the control section of the managing device deletes, from the storage device of the managing device, provisional login information identical to the candidate login information to be deleted.

According to the configuration, the control section of the host device (i) monitors how the host device and the client device are communicated with each other, and (ii) transmits the first login information of the client device to the managing device as candidate login information to be deleted in the case where the host device and the client device do not communicate with each other for a certain period of time. The control section of the managing device deletes, from the storage device of the managing device, the provisional login information identical to the candidate login information to be deleted.

This configuration makes it possible to delete login information of a temporarily connected client device that does not communicate with the host device for a certain period of time. It is therefore possible to prevent the storage device of the managing device from accumulating therein unnecessary login information such as login information of a laptop that has been brought back by a person who made a business trip. This allows (i) a free area to be secured in the storage device of the managing device and (ii) an improvement in processing efficiency of the managing device.

The image processing system can be configured such that the host device includes a storage device, the control section of the host device (i) controls the storage device of the host device to store the provisional login information transmitted to the managing device and (ii) deletes, from the storage device of the host device, the provisional login information identical to the candidate login information to be deleted.

According to the configuration, it is preferable that the host device control the storage device of the host device to store the provisional login information transmitted to the managing device in order to manage the client device. With the configuration, the control section of the host device deletes, from the storage device of the host device, provisional login information that is (i) stored in the storage device of the host device and (ii) identical to the candidate login information to be deleted. This makes it possible to prevent the storage device of the host device from accumulating therein unnecessary login information such as login information of a laptop that has been brought back by a person who made a business trip, It is consequently possible to secure a free area in the storage device of the host device, and to improve a processing efficiency of the host device.

The image processing system can be configured such that to the host device is connectable an information writing device for writing information in a mobile information storage medium, the control section of the host device transmits the provisional login information to the information writing device connected to the host device, and the image processing device can read the information written in the mobile information storage medium presented to the image processing device.

According to the configuration, the control section of the host device transmits the provisional login information to the information writing device connected to the host device. This allows the information writing device to write the provisional login information in the mobile information storage medium. The image processing device reads the provisional login information from the mobile information storage medium in which the provisional login information is written, when the mobile information storage medium is presented to the image processing device.

This allows a guest user to easily log into the image processing device by presenting a mobile information storage medium to the image processing device instead of manually entering provisional login information in a case of using the image processing device.

The image processing system can be configured such that the storage device of the managing device stores, in addition to the provisional login information, normal login information of a normal client device, which normal login information has been set by a procedure different from that by which the provisional login information has been set.

According to the configuration, the storage device of the managing device can separately store therein provisional login information of a temporarily connected client device, and the normal login information of the normal client device.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

REFERENCE SIGNS LIST

101: client PC (client device)
102: host PC (host device, account managing device)
103: multifunction peripheral (image processing device)
104: account managing server (managing device, account managing device)
105: network
106: card reader writer (information writing device)
111: control device
112: storage device
114: input device
115: display device
121: control device (control section, control section of host PC)
122: storage device
131: control device (control device of image forming apparatus)
132: storage device
134: input device
135: display device
136: print device
137: image reading device
141: control device (control section, control section of managing device)
142: storage device

The invention claimed is:

1. An account managing device, to be connected to an image processing device and a client device via a network, comprising:
   a storage device; and
   a control section, the control section carrying out:
   (i) a first process in which the control section (a) obtains client identification information from the client device via the network, (b) determines, on the basis of the client identification information, whether or not a connection request from the client device is a temporary connection request, (c) in a case where the control section determines that the connection request is not the temporary connection request, notifies the client device of connection permission, and (d) in a case where the control section determines that the connection request is the temporary connection request, controls the storage device to store, as provisional login information, first login information contained in the client identification information;
   (ii) a second process in which the control section (e) obtains second login information, which is inputted into the image processing device and is necessary for a usage of the image processing device; and
   (iii) a third process in which the control section (f) permits the usage of the image processing device in a case where the second login information is identical to the provisional login information stored in the storage device.

2. A non-transitory, computer-readable storage medium, in which a program, for causing a computer to function as a control section of the account managing device as recited in claim 1, is stored.

3. An image processing system, in which an image processing device, a client device, a host device, and a managing device are connected to one another via a network,
   the host device comprising a control section,
      the control section of the host device (i) obtaining client identification information from the client device via the network, (ii) determining, on the basis of the client identification information, whether or not a connection request from the client device is a temporary connection request, (iii) in a case where the control section of the host device determines that the connection request is not the temporary connection request, notifying the client device of connection permission, and
      (iv) in a case where the control section of the host device determines that the connection request is the temporary connection request, transmitting, as provisional login information to the managing device, first login information contained in the client identification information,
   the image processing device comprising a control section,
      the control section of the image processing device (i) accepting second login information for a usage of the image processing device and (ii) transmitting the second login information to the managing device, and
   the managing device comprising a control section and a storage device,
      the control section of the managing device (i) controlling the storage device of the managing device to store the provisional login information received from the host device and (ii) permitting the usage of the image processing device in a case where the second login information transmitted from the image processing device is identical to the provisional login information stored in the storage device of the managing device.

4. The image processing system as set forth in claim 3, wherein:

a function of the image processing device, which function can be used by the client device, is limited in a case where the provisional login information permits the image processing device to be used.

5. The image processing system as set forth in claim 3, wherein:

a setting as to whether to permit a provisional connection of the client device is carried out with respect to the control section of the host device.

6. The image processing system as set forth in claim 3, wherein:

the control section of the host device (i) monitors how the host device and the client device are communicated with each other and (ii) transmits the first login information of the client device to the managing device as a candidate login information to be deleted in a case where the host device and the client device do not communicate with each other for a certain period of time, and the control section of the managing device deletes, from the storage device of the managing device, provisional login information identical to the candidate login information to be deleted.

* * * * *